United States Patent
Hu et al.

(10) Patent No.: US 12,094,050 B2
(45) Date of Patent: Sep. 17, 2024

(54) SYSTEMS AND METHODS FOR MOLECULAR IMAGING

(71) Applicant: SHANGHAI UNITED IMAGING HEALTHCARE CO., LTD., Shanghai (CN)

(72) Inventors: Lingzhi Hu, Houston, TX (US); Hongdi Li, Houston, TX (US)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 131 days.

(21) Appl. No.: 17/816,715

(22) Filed: Aug. 1, 2022

(65) Prior Publication Data
US 2024/0037834 A1  Feb. 1, 2024

(51) Int. Cl.
*G06T 7/20* (2017.01)
*G06T 15/00* (2011.01)

(52) U.S. Cl.
CPC .. *G06T 15/005* (2013.01); *G06T 2207/10101* (2013.01)

(58) Field of Classification Search
CPC .... G06T 7/20; G06T 7/80; G06T 7/70; G06T 11/003; G06T 11/005; G06T 2207/10081; G06T 7/0012; G06T 2207/10072; G06T 2200/04; G06T 2207/10108; G06T 2207/10104; G06T 2207/10101
See application file for complete search history.

(56) References Cited

U.S. PATENT DOCUMENTS

| 2015/0366527 A1* | 12/2015 | Yu | G06T 7/0012 |
| | | | 600/407 |
| 2021/0251589 A1* | 8/2021 | Kenig | A61B 6/545 |

OTHER PUBLICATIONS

Jiang, Jianyong et al., A Second-generation Virtual-pinhole PET Device for Enhancing Contrast Recovery and Improving Lesion Detectability of a Whole-body PET/CT Scanner, Medical Physics, 2019, 25 pages.

* cited by examiner

*Primary Examiner* — Hau H Nguyen
(74) *Attorney, Agent, or Firm* — METIS IP LLC

(57) ABSTRACT

The present disclosure provides systems and methods for molecular imaging. The systems and methods may obtain, using at least one 3D camera, image data of at least one movable detector of an ECT device. The systems and methods may determine, based on the image data of the at least one movable detector, an arrangement of the at least one insert detector in a coordinate system that relates to the ECT device. The systems and methods may also obtain image data of an object by performing, using the at least one movable detector, an ECT imaging on the object. The systems and methods may generate, based on the arrangement of the at least one movable detector and the image data of the object, an image of the object.

20 Claims, 10 Drawing Sheets

SYSTEMS AND METHODS FOR MOLECULAR IMAGING

TECHNICAL FIELD

The present disclosure generally relates to imaging technology, and more particularly, relates to systems and methods for molecular imaging.

BACKGROUND

Nuclear imaging (i.e., molecular imaging) has been widely used in a variety of fields including, e.g., medical treatments and/or diagnosis. Many molecular imaging systems (e.g., an emission computed tomography (ECT) system) use fixed geometries (e.g., a ring, a square, a double-flat-panel, etc.) for mounting detectors of the nuclear medical systems. However, the fixed geometries may cause a loss in the imaging resolution of the molecular imaging systems.

SUMMARY

In one aspect of the present disclosure, a system for molecular imaging is provided. The system may include at least one storage device including a set of instructions, and at least one processor configured to communicate with the at least one storage device. When executing the set of instructions, the at least one processor may be configured to direct the system to perform the following operations. The operations may include obtaining, using at least one three-dimensional (3D) camera, image data of at least one movable detector of an emission computed tomography (ECT) device. The operations may also include determining, based on the image data of the at least one movable detector, an arrangement of the at least one movable detector in a coordinate system that relates to the ECT device. The operations may also include obtaining image data of an object by performing, using the at least one movable detector, an ECT imaging on the object. The operations may further include generating, based on the arrangement of the at least one movable detector and the image data of the object, an image of the object.

In some embodiments, the at least one movable detector may be set to the arrangement manually or using one or more robotic arms.

In some embodiments, the arrangement of the at least one movable detector may be determined based on at least one of a target region of the object to be imaged, a resolution ratio of the at least one movable detector, or a sensitivity of the at least one movable detector.

In some embodiments, the at least one 3D camera may include at least one of a time of flight (TOF) camera, a binocular camera, or a structured illumination camera.

In some embodiments, each of the at least one 3D camera may correspond to one or more of the at least one movable detector.

In some embodiments, the arrangement of the at least one movable detector may include at least one of a target position or a target orientation of the at least one movable detector.

In some embodiments, the determining, based on the image data of the at least one movable detector, the arrangement of the at least one movable detector in a coordinate system may include generating, based on the image data of the at least one movable detector, a point cloud image including the at least one movable detector; determining, based on the point cloud image, a first position and a first orientation of the at least one movable detector in a second coordinate system that relates to the at least one 3D camera; and determining, based on the first position and the first orientation of the at least one movable detector and a registration relationship between the coordinate system and the second coordinate system, the target position and the target orientation of the at least one movable detector in the coordinate system.

In some embodiments, the determining, based on the point cloud image, a first position and a first orientation of the at least one movable detector in a second coordinate system may include determining the at least one movable detector in the point cloud image; and determining, based on the determined at least one movable detector in the point cloud image, six degrees of freedom that show the first position and the first orientation of the at least one movable detector in the second coordinate system.

In some embodiments, the ECT device may further include one or more detector rings. The obtaining image data of an object by performing, using the at least one movable detector, an ECT imaging on the object may include performing the ECT imaging using the at least one movable detector and the one or more PET rings; and obtaining the image data of the object acquired by the at least one movable detector and the one or more PET rings. The image data of the object may include a first portion acquired by the at least one movable detector and a second portion acquired by the one or more detector rings.

In some embodiments, the generating an image of the object based on the arrangement of the at least one movable detector and the image data of the object may include determining a system matrix of the ECT device based on the arrangement of the at least one movable detector; and generating the image of the object based on the system matrix and the image data of the object.

In some embodiments, the ECT device may include a positron emission tomography (PET) device or a single-photon emission computerized tomography (SPECT) device.

In another aspect of the present disclosure, a method for molecular imaging is provided. The method may be implemented on a computing device having at least one processor and at least one storage device. The method may include obtaining, using at least one three-dimensional (3D) camera, image data of at least one movable detector of an emission computed tomography (ECT) device; determining, based on the image data of the at least one movable detector, an arrangement of the at least one movable detector in a coordinate system that relates to the ECT device; obtaining image data of an object by performing, using the at least one movable detector, an ECT imaging on the object; and generating, based on the arrangement of the at least one movable detector and the image data of the object, an image of the object.

In some embodiments, the at least one movable detector may be set to the arrangement manually or using one or more robotic arms.

In some embodiments, the arrangement of the at least one movable detector may be determined based on at least one of a target region of the object to be imaged, a resolution ratio of the at least one movable detector, or a sensitivity of the at least one movable detector.

In still another aspect of the present disclosure, a system for imaging is provided. The system may include an emission computed tomography (ECT) device including at least one movable detector configured to be arranged to acquire image data of an object; and at least one three-dimensional (3D) camera configured to obtain image data of the at least one movable detector for determining an arrangement of the at least one movable detector in a coordinate system that relates to the ECT device. The image data of the object and the arrangement of the at least one movable detector may be used to generate an image of the object.

In some embodiments, the arrangement of the at least one movable detector may include at least one of a target position and a target orientation of the at least one movable detector.

In some embodiments, the at least one 3D camera may include at least one of a time of flight (TOF) camera, a binocular camera, or a structured illumination camera.

In some embodiments, each of the at least one 3D camera may correspond to one or more of the at least one movable detector.

In some embodiments, the ECT device may further include one or more detector rings, and the image data of the object may include a first portion acquired by the at least one movable detector and a second portion acquired by the one or more detector rings.

In some embodiments, the ECT device may include a positron emission tomography (PET) device or a single-photon emission computerized tomography (SPECT) device.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections, or assembly of different levels in ascending order. However, the terms may be displaced by another expression if they achieve the same purpose.

Figure 2:
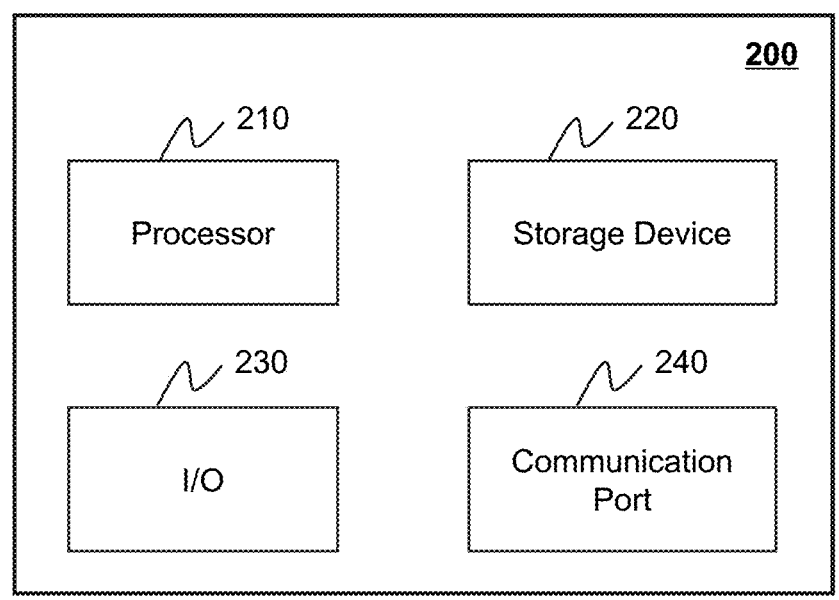
FIG. 2 is a block diagram illustrating exemplary hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., a processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items. For example, the expression "A and/or B" includes only A, only B, or both A and B. The character "/" includes one of the associated listed terms. The term "multiple" or "a/the plurality of" in the present disclosure refers to two or more. The terms "first," "second," and "third," etc., are used to distinguish similar objects and do not represent a specific order of the objects.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are medical systems and methods for non-invasive imaging, such as for disease diagnosis, treatment, and/or research purposes. In some embodiments, the medical system may include a single modality system and/or a multi-modality system. The term "modality" used herein broadly refers to an imaging or treatment method or technology that gathers, generates, processes, and/or analyzes imaging information of a subject or treatments the subject. In some embodiments, the medical system may include a single-modality system or a multi-modality system that includes modules and/or components for performing molecular imaging and/or related analysis. Exemplary single-modality systems may include an emission computed tomography (ECT) system, e.g., a positron emission tomography (PET) system, a single photon emission computed tomography (SPECT) system, etc. Exemplary multi-modality system may include a positron emission tomography-computed tomography (PET-CT) system, a positron emission tomography-magnetic resonance (PET-MR) system, a single photon emission computed tomography-computed tomography (SPECT-CT) system, etc.

In the present disclosure, the subject may include a biological object and/or a non-biological object. The biological object may be a human being, an animal, a plant, or a specific portion, organ, and/or tissue thereof. For example, the subject may include the head, the neck, the thorax, the heart, the stomach, a blood vessel, a soft tissue, a tumor, a nodule, or the like, or any combination thereof. In some embodiments, the subject may be a man-made composition of organic and/or inorganic matters that are with or without life. The terms "object" and "subject" are used interchangeably in the present disclosure.

In the present disclosure, the term "image" may refer to a two-dimensional (2D) image, a three-dimensional (3D) image, or a four-dimensional (4D) image (e.g., a time series of 3D images). In some embodiments, the term "image" may refer to an image of a region (e.g., a region of interest (ROI)) of a subject. In some embodiment, the image may be a medical image, an optical image, etc. In the present disclosure, the term "insert detector" may refer to a detector that can be movable so as to be arranged to image an object and may also be referred to as a movable detector. That is, the terms "insert detector" and "movable detector" may be used interchangeably in the present disclosure. In the present disclosure, the term "accuracy of a component" may refer to a difference between a measured distance determined by the component and a true distance of the measured distance.

In the present disclosure, a representation of an object (e.g., a patient, a subject, or a portion thereof) in an image may be referred to as an "object" for brevity. For instance, a representation of an organ or tissue (e.g., a heart, a liver, a lung) in an image may be referred to as an organ or tissue for brevity. Further, an image including a representation of an object may be referred to as an image of an object or an image including an object for brevity. Still further, an operation performed on a representation of an object in an image may be referred to as an operation performed on an object for brevity. For instance, a segmentation of a portion of an image including a representation of an organ or tissue from the image may be referred to as a segmentation of an organ or tissue for brevity.

For performing an imaging scan of a patient using one or more insert detectors, robotic arm(s) with high-precision may be used to move and position the one or more insert detectors for achieving desired imaging accuracy. Such high-precision robotic arm(s) may be very expensive to acquire and/or maintain, which may lead to enormous costs. Therefore, it is desirable to provide efficient systems and methods for positioning the insert detector(s) for imaging, thereby avoiding or reducing the dependence on such costly high-precision robotic arm(s).

An aspect of the present disclosure relates to systems and methods for molecular imaging. The systems may obtain, using at least one three-dimensional (3D) camera, image data of at least one insert detector (i.e., at least one movable detector) of an emission computed tomography (ECT) device. The system may also determine, based on the image data of the at least one insert detector, an arrangement of the at least one insert detector in a coordinate system that relates to the ECT device. The system may obtain image data of the object by performing, using the at least one insert detector, an ECT imaging on the object. Further, the system may generate, based on the arrangement of the at least one insert detector and the image data of the object, an image of the object.

Another aspect of the present disclosure relates to a system for imaging. The system may include an emission computed tomography (ECT) device including at least one insert detector. The at least one insert detector may be moveable so as to be arranged to acquire image data of an object. The system may also include at least one three-dimensional (3D) camera configured to obtain image data of the at least one detector for determining an arrangement of the at least one insert detector in a coordinate system that relates to the ECT device. The image data of the object and the arrangement of the at least one insert detector are used to generate an image of the object.

According to the systems and methods of the present disclosure, by using the at least one insert detector during an ECT imaging, a distance between the insert detector and the object may be reduced, thereby improving imaging resolution and/or imaging sensitivity of the ECT imaging, which in turn may improve quality of the image of the object. In addition, the at least one 3D camera may achieve similar accuracy in determining an arrangement of the at least one insert detector in an ECT imaging as the high-precision robotic arm(s). By using the at least one 3D camera, the arrangement of the at least one insert detector may be determined without using costly high-precision robotic arm(s), thereby improving imaging accuracy of the ECT imaging reduces or avoiding the enormous costs, which in turn may further improve the quality of the image of the object.

Figure 1:
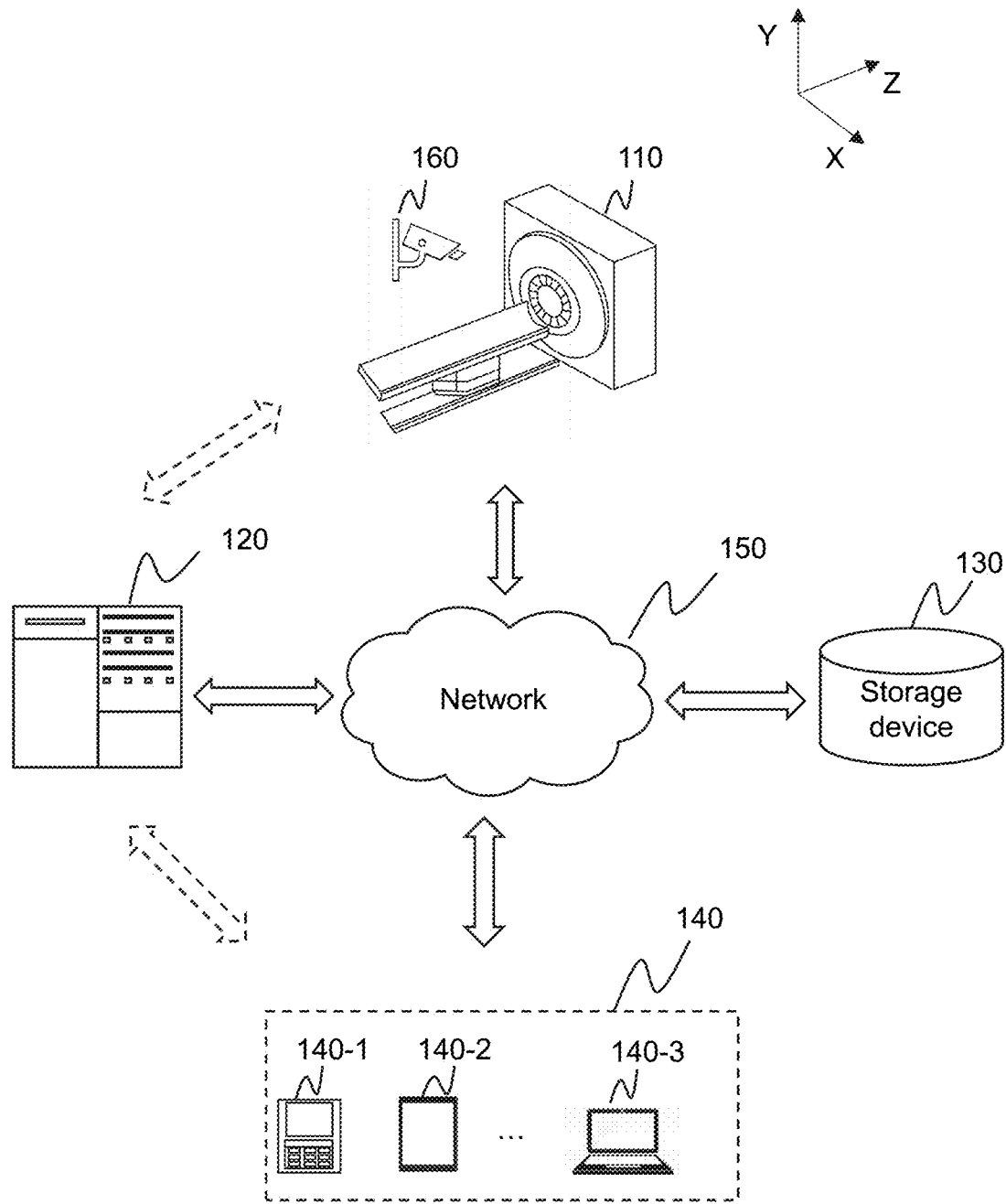
FIG. 1 is a schematic diagram illustrating an exemplary medical system according to some embodiments of the present disclosure.

FIG. 1 is a schematic diagram illustrating an exemplary medical system according to some embodiments of the present disclosure. As shown in FIG. 1, the medical system 100 may include a medical device 110, a processing device 120, a storage device 130, one or more terminals 140, a network 150, and at least one image acquisition device 160 (e.g., one or more three-dimensional (3D) cameras). The components in the medical system 100 may be connected in one or more of various ways. Merely by way of example, as illustrated in FIG. 1, the medical device 110 may be operably connected to the processing device 120 through the network 150. As another example, the medical device 110 may be operably connected to the processing device 120 directly. As a further example, the storage device 130 may be operably connected to the processing device 120 directly or through the network 150. As still a further example, one or more terminals 140 may be operably connected to the processing device 120 directly or through the network 150. As still a further example, the at least one image acquisition device 160 may be operably connected to the processing device 120 directly or through the network 150.

The medical device 110 may be configured to generate or provide image data by scanning an object or at least a part of the object. For example, the medical device 110 may obtain the image data of the object by performing an ECT imaging on the object. In some embodiments, the medical device 110 may include an imaging component, e.g., an ECT device, for performing molecular imaging. Exemplary ECT devices may include a PET device, a SPECT device, etc. In some embodiments, the medical device 110 may include a single-modality scanner. The single-modality scanner may include, for example, an ECT scanner. Exemplary ECT scanners may include a PET scanner, a SPECT scanner, etc. In some embodiments, the medical device 110 may include a plurality of scanners, for example, both the ECT scanner and a CT scanner. In some embodiments, image data of different modalities related to the object, such as CT image data and PET image data, may be acquired using different scanners separately. In some embodiments, the medical device 110 may include a multi-modality scanner. The multi-modality scanner may include a PET-CT scanner, a PET-MRI scanner, a SPECT-CT scanner. The multi-modality scanner may perform a multi-modality imaging. For example, the PET-CT scanner may generate CT image data providing morphological information and PET image data providing functional information. The PET-MRI scanner may generate both MRI data and PET data. In some embodiments, terms "ECT scanner" and "ECT device" are used interchangeably in the present disclosure.

Figure 10:
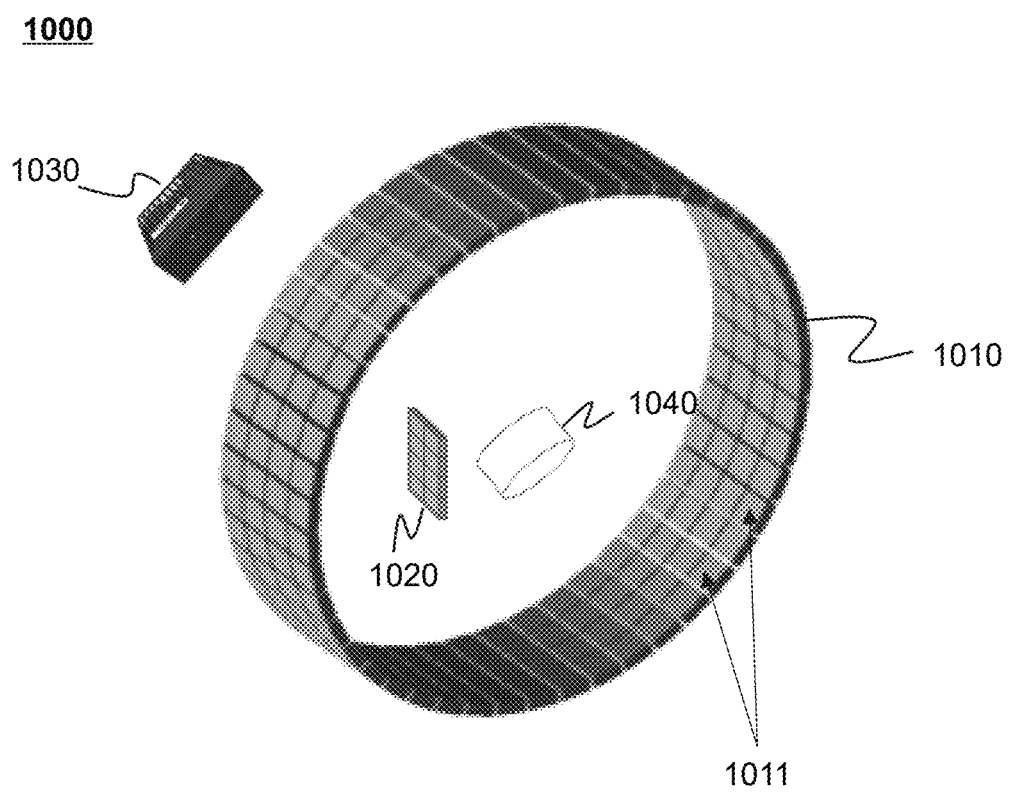
FIG. 10 is a schematic diagram illustrating an exemplary medical device according to some embodiments of the present disclosure.

Merely by way of example, the medical device 110 may include an ECT scanner. The ECT scanner may include a gantry with a bore, a table, a plurality of fixed detector units (e.g., fixed on the gantry of the ECT scanner), at least one insert detector, etc. The object may be placed on the table and transmitted to a detection region of the medical device 110 for imaging. The plurality of fixed detector units may be implemented in any suitable manner, for example, a ring, an arc, a rectangle, an array, or the like, or any combination thereof. For instance, the plurality of fixed detector units may be disposed in the form of one or more detector rings. Each of the one or more detector rings may include multiple fixed detector units arranged along the circumferential direction of the detector ring. The at least one insert detector and the one or more detector rings may be configured to perform an ECT imaging on the object. Merely by way of example, FIG. 10 illustrates an exemplary medical device 1000. As shown, the medical device 1000 may include a detector ring 1010 including a plurality of detector units 1011 and an insert detector 1020. The detector ring 1010 and the insert detector 1020 may be configured to perform an ECT imaging on an object 1040. An image acquisition device 1030 may be configured to obtain image data of the insert detector 1020, or a portion thereof, for positioning the insert detector 1020. During the ECT imaging using the plurality of detector units 1011 and the insert detector 1020, some detector units of the plurality of detector units 1011 may be blocked by the insert detector 1020 so as to detect no scan data. Scan data detected by the insert detector 1020 may be used to be instead of scan data corresponding to the some detector units for image reconstruction with scan data detected by the remaining detector units of the plurality of detector units 1011. In some embodiments, the ECT scanner may include only the at least one insert detector, but no fixed detector units, for performing an ECT imaging on a region of interest (ROI) of the object. In some embodiments, the at least one insert detector may be set manually or automatically (e.g., using one or more robotic arms). More descriptions of the ECT scanner with at least one insert detector may be found elsewhere in the present disclosure (e.g., FIGS. 4A-4B and 5A-5C, and the descriptions thereof).

In an ECT imaging (e.g., a PET imaging), a radiopharmaceutical (also referred to as a radioactive tracer) may be administered to the object, in which radioactive decay events of the radiopharmaceutical may produce positrons. A positron may interact with a free electron in the tissue of the object to produce a positron-electron annihilation event and emit two oppositely directed gamma (γ) photons. One or more detector rings and/or at least one insert detector may detect the two oppositely directed γ photons, and convert the two oppositely directed γ photons to electronic signals using a photoelectric component. For example, the two oppositely directed γ photons emitted by a same annihilation event may be detected by two detector units that are oppositely arranged of the one or more detector rings. As another example, one of the two oppositely directed γ photons emitted by a same annihilation event may be detected by a detector unit of the one or more detector rings, and another one of the two oppositely directed γ photons emitted by a same annihilation event may be detected by an insert detector of the at least one insert detector. As another example, the two oppositely directed γ photons emitted by a same annihilation event may be detected by two insert detectors that are oppositely arranged of the at least one insert detector. Further, a coincident event may be determined by amplification, analog-to-digital conversion, energy and time discrimination, or the like, or any combination thereof.

In some embodiments, the medical device 110 may transmit the image data via the network 150 to one or more components (e.g., the processing device 120, the storage device 130, or the terminal(s) 140) of the medical system 100. For example, the image data may be sent to the processing device 120 for further processing or may be stored in the storage device 130. In some embodiments, the medical device 110 may be configured to scan the object or at least a part of the object in response to a control signal generated by the processing device 120.

The processing device 120 may process data and/or information obtained from the medical device 110, the storage device 130, the terminal(s) 140, and/or the at least one image acquisition device 160. For example, the processing device 120 may obtain, using the at least one image acquisition device 160 (e.g., at least one 3D camera), image data of the at least one insert detector of the medical device 110 (e.g., an ECT device). The processing device 120 may determine, based on the image data of the at least one insert detector, an arrangement of the at least one insert detector in a coordinate system that relates to the ECT device. The processing device 120 may obtain image data of the object by performing, using the at least one insert detector, an ECT imaging on the object. The processing device 120 may further generate, based on the arrangement of the at least one insert detector and the image data of the object, an image of the object. As another example, the processing device 120 may generate, based on the image data of the at least one insert detector, a point cloud image including the at least one insert detector. The processing device 120 may determine, based on the point cloud image, a first position and a first orientation of the at least one insert detector in a second coordinate system that relates to the at least one image acquisition device 160. The processing device 120 may determine, based on the first position and the first orientation of the at least one insert detector and a registration relationship between the coordinate system and the second coordinate system, the target position and the target orientation of the at least one insert detector in the coordinate system.

In some embodiments, the processing device 120 may be a single server or a server group. The server group may be centralized or distributed. In some embodiments, the processing device 120 may be local or remote. For example, the processing device 120 may access information and/or data from the medical device 110, the storage device 130, the terminal(s) 140, and/or the at least one image acquisition device 160 via the network 150. As another example, the processing device 120 may be directly connected to the medical device 110, the terminal(s) 140, the storage device 130 and/or the at least one image acquisition device 160 to access information and/or data. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 120 may be implemented by a computing device 200 having one or more components as illustrated in FIG. 2 or be a portion of the terminal 140.

The storage device 130 may store data, instructions, and/or any other information. In some embodiments, the storage device 130 may store data obtained from the medical device 110, the processing device 120, the terminal(s) 140, and/or the at least one image acquisition device 160. In some embodiments, the storage device 130 may store data and/or instructions that the processing device 120 may execute or use to perform exemplary methods described in the present disclosure. In some embodiments, the storage device 130 may include a mass storage device, a removable storage device, a volatile read-and-write memory, a read-only memory (ROM), or the like, or any combination thereof. In some embodiments, the storage device 130 may be implemented on a cloud platform as described elsewhere in the disclosure. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components in the medical system 100 (e.g., the processing device 120, the terminal(s) 140, the at least one image acquisition device 160, etc.). One or more components in the medical system 100 may access the data or instructions stored in the storage device 130 via the network 150. In some embodiments, the storage device 130 may be part of the processing device 120.

The terminal(s) 140 may input/output signals, data, information, etc. In some embodiments, the terminal(s) 140 may enable user interaction with the medical device 110, the processing device 120, the storage device 130, and/or the at least one image acquisition device 160. For example, the terminal(s) 140 may obtain a generated image from the processing device 120 for display. As another example, the terminal(s) 140 may obtain information input by a user through an input device (e.g., a keyboard, a touch screen, a brain wave monitoring device), and transmit the input information to the processing device 120 for further processing. In some embodiments, the terminal(s) 140 may include a mobile device 140-1, a tablet computer 140-2, a laptop computer 140-3, or the like, or any combination thereof. For example, the mobile device 140-1 may include a smart home device, a wearable device, a mobile phone, a virtual reality device, an augmented reality device, or the like, or any combination thereof. Merely by way of example, the terminal(s) 140 may include a mobile device as exemplified in FIG. 3. In some embodiments, the terminal(s) 140 may include an input device, an output device, etc. The input device may include alphanumeric and other keys that may be input via a keyboard, a touch screen (for example, with haptics or tactile feedback), a speech input, an eye-tracking input, a brain monitoring system, or any other comparable input mechanism. The input information received through the input device may be transmitted to the processing device 120 via, for example, a bus, for further processing. Other types of the input device may include a cursor control device, such as a mouse, a trackball, or cursor direction keys, etc. The output device may include a display, a speaker, a printer, or the like, or a combination thereof. In some embodiments, the terminal(s) 140 may be part of the processing device 120. In some embodiments, the terminal(s) 140 may be integrated with the processing device 120 as an operation station of the medical device 110. Merely by way of example, a user/operator (for example, a doctor) of the medical system 100 may control an operation of the medical device 110 through the operation station.

The network 150 may include any suitable network that can facilitate the exchange of information and/or data for the medical system 100. In some embodiments, one or more components of the medical system 100 (e.g., the medical device 110, the processing device 120, the storage device 130, the terminal(s) 140, the at least one image acquisition device 160, etc.) may communicate information and/or data with one or more other components of the medical system 100 via the network 150. For example, the processing device 120 may obtain image data from the medical device 110 via the network 150. As another example, the processing device 120 may obtain user instruction(s) from the terminal(s) 140 via the network 150. The network 150 may include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, server computers, or the like, or a combination thereof. For example, the network 150 may include a wireline network, an optical fiber network, a telecommunication network, a local area network, a wireless local area network (WLAN), a metropolitan area network (MAN), a public telephone switched network (PSTN), a Bluetooth™ network, a ZigBee™ network, a near field communication (NFC) network, or the like, or a combination thereof. In some embodiments, the network 150 may include one or more network access points. For example, the network 150 may include wired and/or wireless network access points such as base stations and/or internet exchange points, through which one or more components of the medical system 100 may be connected to the network 150 to exchange data and/or information.

The at least one image acquisition device 160 may be configured to obtain the image data of the at least one insert detector of the medical device 110 (e.g., an ECT device). The image data of the at least one insert detector may be used to determine an arrangement of the at least one insert detector in a coordinate system that relates to the medical device 110. In some embodiments, the at least one image acquisition device 160 may obtain the image data of the at least one insert detector of the medical device 110 before or during the ECT imaging on the subject. For example, the at least one image acquisition device 160 may be directed to obtain the image data of the at least one insert detector during the ECT imaging continuously or intermittently (e.g., periodically) so that the arrangement of the at least one insert detector in the coordinate system that relates to the medical device 110 may be tracked in real-time or intermittently. More descriptions of the obtaining of the image data of the at least one insert detector may be found elsewhere in the present disclosure (e.g., FIGS. 6-8 and the descriptions thereof).

In some embodiments, the at least one image acquisition device 160 may include a 3D camera, an imaging sensor, or the like, or any combination thereof. Exemplary 3D cameras may include a time of flight (TOF) camera, a binocular camera, a structured illumination camera, a stereo triangulation camera, a sheet of light triangulation device, an interferometry device, a coded aperture device, a stereo matching device, or the like, or any combination thereof. Exemplary imaging sensors may include a radar sensor, a 3D laser imaging sensor, or the like, or any combination thereof. In some embodiments, to achieve a desired quality of the image of the object, information of the arrangement of the at least one insert detector may need to satisfy an accuracy condition. For example, the accuracy condition may include that a measurement error of the arrangement of the at least one insert detector is less than or equal to a distance threshold; that is, a difference between a measured arrangement of the at least one insert detector that is determined based on the image data of the at least one insert detector and a true arrangement of the at least one insert detector is less than or equal to a distance threshold. The distance threshold may include 1 millimeter, 0.5 millimeters, 0.2 millimeters, 0.1 millimeters, etc. Accordingly, the at least one image acquisition device 160 may achieve an accuracy level less than or equal to the distance threshold in measuring an arrangement of the at least one insert detector.

In some embodiments, the at least one image acquisition device 160 may correspond to one or more of the at least one insert detector. As used herein, an image acquisition device 160 corresponding to an insert detector may indicate that the image acquisition device 160 is used to acquire image data of the insert detector for determining an arrangement of the insert detector. For example, each of the at least one image acquisition device 160 may correspond to only one of the at least one insert detector. As another example, at least one of the at least one image acquisition device 160 may correspond to two or more of the at least one insert detector. As still another example, a correspondence between the at least one image acquisition device 160 and the at least one insert detector may be determined based on a position of the at least one image acquisition device 160 and an arrangement of the at least one insert detector.

In some embodiments, the at least one image acquisition device 160 may be disposed at various suitable positions, as long as the at least one insert detector is within a field of view (FOV) of the at least one image acquisition device 160 for obtaining image data of the at least one insert detector of the medical device 110. In some embodiments, the insert detector may be of a rigid structure, and the arrangement of the insert detector may be determined based on information of an arrangement of a portion of the insert detector. Accordingly, as used herein, an insert detector is within an FOV of its corresponding image acquisition device 160 may refer to that at least a portion of the insert detector is within the FOV of its corresponding image acquisition device 160.

In some embodiments, the at least one image acquisition device 160 may be arranged on a component (e.g., a PET scanner, a table, etc.) of the medical device 110. For example, the imaging component (e.g., the PET scanner) of the medical device 110 may include a PET scanner with a short axial field of view (FOV). The short axial FOV refers to that the length of the axial FOV of the PET scanner 110 along a longitudinal direction of the PET scanner 110 is less than a preset threshold (e.g., 1 meter, 0.7 meters, meters, etc.). The longitudinal direction of the PET scanner may be a direction that the table enters the bore. The longitudinal direction of the PET scanner may be parallel to a Z-axis of the medical device 110 as shown in FIG. 1. The at least one image acquisition device 160 may be disposed at an end or both ends of the bore of the PET scanner. For instance, if there are two imaging components 160, the two imaging components 160 may be disposed at two ends of the bore of the PET scanner, respectively; or the two imaging components 160 may be disposed one a same end of the bore of the PET scanner. As another example, the imaging component (e.g., the PET scanner) of the medical device 110 may include a PET scanner with a long axial FOV. The long axial FOV refers to that that the length of the axial FOV of the PET scanner along the axis direction of the PET scanner is greater than a preset threshold (e.g., 1 meter, 0.7 meters, 0.5 meters, etc.). The at least one image acquisition device 160 may be disposed between at least two detector rings of the PET scanner. For instance, if the PET scanner includes two detector rings, the at least one image acquisition device 160 may be disposed between the two detector rings of the PET scanner. Accordingly, the at least one image acquisition device 160 may be disposed properly without affecting the operation of the detector ring(s) and/or the at least one insert detector. As yet another example, the at least one image acquisition device 160 may be supported by a holder of the imaging component of the medical device 110. The holder may be arranged on the table, the gantry, etc., of the medical device 110. In some embodiments, the at least one image acquisition device 160 may be disposed on a structure independent of the medical device 110. For example, the at least one image acquisition device 160 may be disposed on a frame attached to a wall or the ceiling, or placed on the floor of a room where the medical device 110 is located.

In some embodiments, a count of the at least one insert detector of the PET scanner, a count of the detector ring(s) of the PET scanner, a count of the at least one image acquisition device 160, and/or the position of the at least one image acquisition device 160 may be set or adjusted according to different clinical situations, which is not limited herein.

In some embodiments, although a connection between the at least one image acquisition device 160 and the medical device 110 is not shown in FIG. 1, the at least one image acquisition device 160 may be part of the medical device 110. More descriptions of the image acquisition device 160 may be found elsewhere in the present disclosure (e.g., FIG. 4A and the descriptions thereof).

It should be noted that the above description regarding the medical system is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the medical system may include one or more additional components, and/or one or more components of the medical system described above may be omitted. In some embodiments, a component of the medical system may be implemented on two or more sub-components. Two or more components of the medical system may be integrated into a single component.

FIG. 2 is a schematic diagram illustrating exemplary hardware and/or software components of an exemplary computing device according to some embodiments of the present disclosure. The computing device 200 may be configured to implement any component of the medical system. For example, the medical device 110, the terminal 140, the processing device 120, and/or the storage device 130 may be implemented on the computing device 200. Although only one such computing device is shown for convenience, the computer functions relating to the medical system as described herein may be implemented in a distributed fashion on a number of similar platforms, to distribute the processing load. As illustrated in FIG. 2, the computing device 200 may include a processor 210, a storage device 220, an input/output (I/O) 230, and a communication port 240.

The processor 210 may execute computer instructions (e.g., program codes) and perform functions of the processing device 120 in accordance with techniques described herein. The computer instructions may include, for example, routines, programs, objects, components, signals, data structures, procedures, modules, and functions, which perform particular functions described herein. In some embodiments, the processor 210 may perform instructions obtained from the terminal 140 and/or the storage device 130. In some embodiments, the processor 210 may include one or more hardware processors, such as a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage device 220 may store data/information obtained from the medical device 110, the terminal 140, the storage device 130, the at least one image acquisition device 160, or any other component of the medical system 100. In some embodiments, the storage device 220 may include a mass storage device, a removable storage device, a volatile read-and-write memory, a read-only memory (ROM), or the like, or any combination thereof. For example, the mass storage device may include a magnetic disk, an optical disk, a solid-state drive, a mobile storage device, etc. The removable storage device may include a flash drive, a floppy disk, an optical disk, a memory card, a ZIP disk, a magnetic tape, etc. The volatile read-and-write memory may include a random access memory (RAM). The RAM may include a dynamic RAM (DRAM), a double date rate synchronous dynamic RAM (DDR-SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), a digital versatile disk ROM, etc. In some embodiments, the storage device 220 may store one or more programs and/or instructions to perform exemplary methods described in the present disclosure.

The I/O 230 may input or output signals, data, and/or information. In some embodiments, the I/O 230 may enable user interaction with the processing device 120. In some embodiments, the I/O 230 may include an input device and an output device. Exemplary input devices may include a keyboard, a mouse, a touch screen, a microphone, a camera capturing gestures, or the like, or a combination thereof. Exemplary output devices may include a display device, a loudspeaker, a printer, a projector, a 3D hologram, a light, a warning light, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected with a network (e.g., the network 150) to facilitate data communications. The communication port 240 may establish connections between the processing device 120 and the medical device 110, the terminal 140, the storage device 130, the at least one image acquisition device 160, or any external devices (e.g., an external storage device, or an image/data processing workstation). The connection may be a wired connection, a wireless connection, or a combination of both that enables data transmission and reception. The wired connection may include an electrical cable, an optical cable, a telephone wire, or the like, or any combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

In some embodiments, the computing device 200 may further include a bus (not shown) configured to achieve the communication between the processor 210, the storage device 220, the I/O 230, and/or the communication port 240. The bus may include hardware, software, or both, which decouple the components of the computing device 200 to each other. The bus may include at least one of a data bus, an address bus, a control bus, an expansion bus, or a local bus. For example, the bus may include an accelerated graphics port (AGP) or other graphics bus, an extended industry standard architecture (EISA) bus, a front side bus (FSB), a hyper transport (HT) interconnection, an industry standard architecture (ISA) bus, a front side bus (FSB), an Infiniband interconnection, a low pin count (LPC) bus, a storage bus, a micro channel architecture (MCA) bus, a peripheral component interconnect (PCI) bus, a PCI-Express (PCI-X) bus, a serial advanced technology attachment (SATA) bus, a video electronics standards association local bus (VLB) bus, or the like, or any combination thereof. In some embodiments, the bus may include one or more buses. Although specific buses are described, the present disclosure may consider any suitable bus or interconnection.

Figure 3:
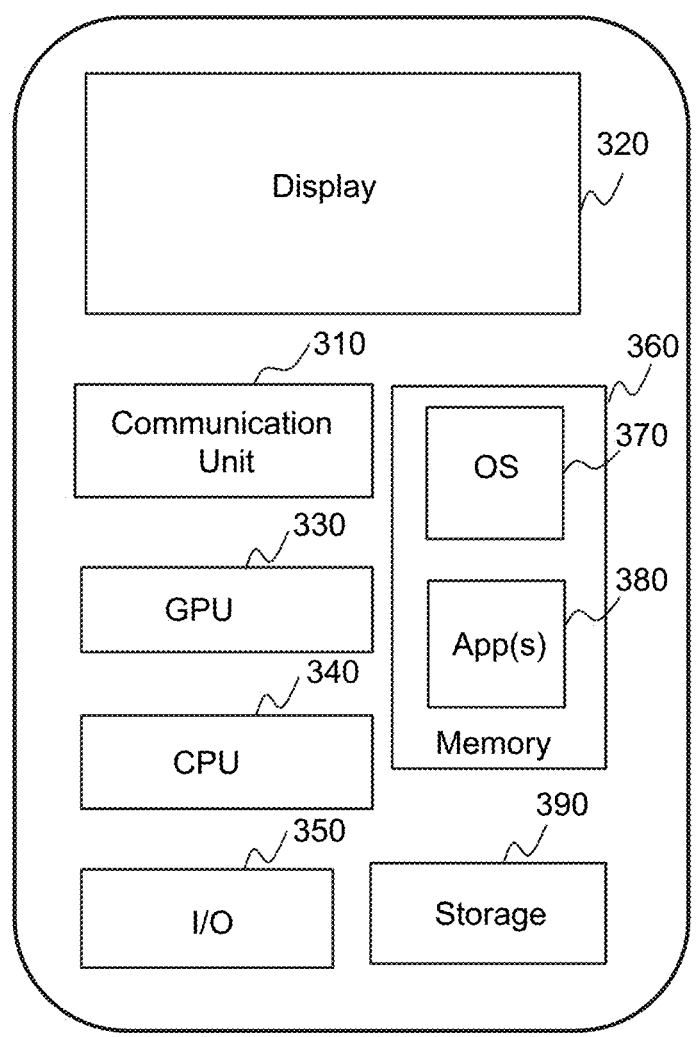
FIG. 3 is a schematic diagram illustrating exemplary hardware and/or software components of an exemplary mobile device on which a terminal may be implemented according to some embodiments of the present disclosure.

FIG. 3 is a schematic diagram illustrating exemplary hardware and/or software components of an exemplary mobile device 300 on which the terminal 140 may be implemented according to some embodiments of the present disclosure. As illustrated in FIG. 3, the mobile device 300 may include a communication unit 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system (OS) 370 (e.g., iOS™, Android™, Windows Phone™, etc.) and one or more applications (App(s)) 380 may be loaded into the memory 360 from the storage 390 in order to be executed by the CPU 340. The applications 380 may include a browser or any other suitable mobile apps for receiving and rendering information relating to image processing or other information from the processing device 120. User interactions with the information stream may be achieved via the I/O 350 and provided to the processing device 120 and/or other components of the medical system 100 via the network 150. In some embodiments, a user may input parameters to the medical system 100, via the mobile device 300.

In order to implement various modules, units and their functions described above, a computer hardware platform may be used as hardware platforms of one or more elements (e.g., the processing device 120 and/or other components of the medical system 100 described in FIG. 1). Since these hardware elements, operating systems and program languages are common; it may be assumed that persons skilled in the art may be familiar with these techniques and they may be able to provide information needed in the image processing operations according to the techniques described in the present disclosure. A computer with the user interface may be used as a personal computer (PC), or other types of workstations or terminal devices. After being properly programmed, a computer with the user interface may be used as a server. It may be considered that those skilled in the art may also be familiar with such structures, programs, or general operations of this type of computing device.

Figure 4A:
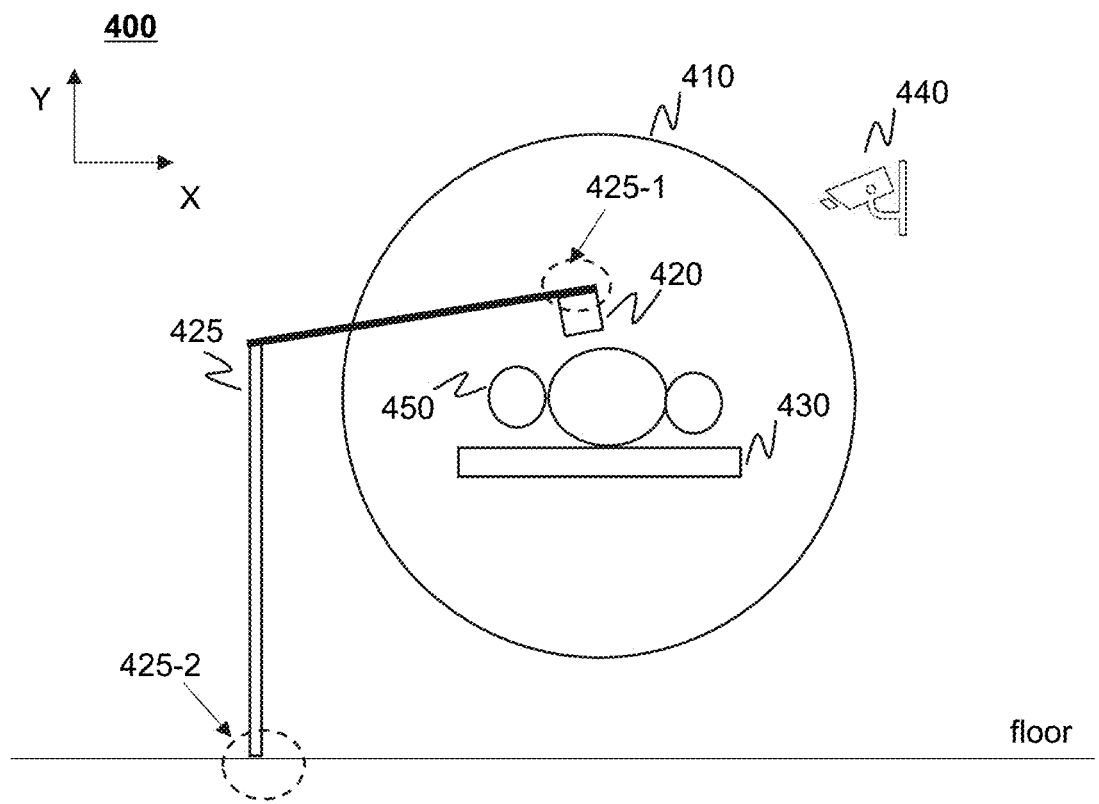
FIGS. 4A and 4B are schematic diagrams illustrating exemplary medical devices according to some embodiments of the present disclosure.

FIG. 4A is a schematic diagram illustrating an exemplary medical device according to some embodiments of the present disclosure. As shown in FIG. 4A, the medical device 400 may include an imaging component 410, an insert detector 420, a table 430, and an image acquisition device (e.g., a 3D camera 440). An object 450 may be placed on the table 430 and be transmitted to a detection region of the imaging component 410 for imaging. It should be noted that the count (or number) of the single insert detector 420 and/or the count (or number) of the 3D camera 440, as well as their respective arrangements, as shown in FIG. 4A are merely provided for illustration, and not intended to limit the scope of the present disclosure. It is understood that the medical device 400 may include more than one insert detector and/or more than one 3D camera, and the insert detector 420 and/or the 3D camera 440 may be disposed in arrangements other than other exemplified in FIG. 4A. For example, more than one insert detector may be disposed around the object 450. As another example, more than one 3D camera may be disposed at various suitable positions for obtaining image data of the insert detector 420.

The imaging component 410 may be configured to perform a scan on the object 450, or at least a part thereof, to acquire corresponding scan data (also referred to as a second portion of image data of the object 450). In some embodiments, the imaging component 410 may include a single-modality scanner. For example, the imaging component 410 may include an ECT scanner such as a PET scanner or a SPECT scanner. The ECT scanner may include one or more detector rings disposed in a bore of the ECT scanner. In some embodiments, the imaging component 410 may include a multi-modality scanner. For example, the imaging component 410 may include a PET-CT scanner or a SPECT-CT scanner. In some embodiments, the imaging component 410 may include a plurality of scanners. For example, the imaging component 410 may include a PET scanner and a CT scanner. For illustration purposes, the following description is provided with reference to the imaging component 410 being an ECT scanner 410 (i.e., the medical device 400 being an ECT device), which is not intended to limit the scope of the present disclosure.

The insert detector 420 may be configured to perform a scan on a region of the object 450 to acquire image data of the region of the object 450 (also referred to as a first portion of the image data of the object 450). For example, the insert detector 420 may be used to perform an ECT imaging on the object 450 simultaneously with the ECT scanner 410 to acquire the first portion of the image data of the object 450. In some embodiments, the insert detector 420 may have the configuration of a flat-panel. Exemplary shapes of the insert detector 420 may include a regular shape (e.g., a circle, a square, a rectangle, etc.) or an irregular shape. In some embodiments, the insert detector 420 may include a plurality of detector modules. Each of the plurality of detector modules may include a sensor layer and a readout electronic layer (e.g., including one or more processing circuits). The sensor layer may be configured to detect radiation rays (e.g., gamma photons) emitted from the object 450 to generate an electric signal, and the readout electronic layer may be configured to process the electrical signal. In some embodiments, the sensor layer may include one or more crystal components (e.g., one or more scintillators) and one or more photoelectric conversion components (e.g., a silicon photomultiplier (SiPM), a photomultiplier tube (PMT)). The one or more crystal components may be configured to receive the radiation rays (e.g., gamma photons) and generate an optical signal. The one or more photoelectric conversion components may be configured to convert the optical signal to an electrical signal. Exemplary materials suitable for the scintillators may include sodium iodide (NaI), cesium iodide (CsI), lanthanum bromide (LaBr3), lanthanum chloride (LaCl3), lutetium oxyorthosilicate (Lu2SiO5), lutetium yttrium orthosilicate (LYSO), lutetium pyrosilicate, bismuth germinate (BGO), gadolinium orthosilicate (GSO), lutetium gadolinium orthosilicate, barium fluoride (BaF2), yttrium aluminate (YAlO3), or the like, or any combination thereof. Alternatively, the sensor layer may include a semiconductor layer that is configured to directly convert the radiation rays (e.g., the gamma photons) into the electrical signal. In some embodiments, the insert detector 420 may include the plurality of detector modules arranged in an array, for example, a 4×8 array, a 5×8 array, etc. In some embodiments, a count (or number) of the plurality of detector modules may be determined according to actual needs. For example, the plurality of detector modules may be arranged to form a desired shape of the insert detector 420. In some embodiments, the count (or number) of the plurality of detector modules may be 2, 4, 6, 8, 10, 12, 16, 20, 24, 32, 40, etc.

In some embodiments, the insert detector 420 may be moveable so as to be arranged to image the object 450. For instance, the insert detector 420 may be moved to an arrangement for performing an ECT imaging on the object 450. The arrangement may include a position and/or an orientation of the insert detector 420 when the insert detector 420 is performing the ECT imaging on the object 450. In some embodiments, the insert detector 420 may be arranged to satisfy a desired resolution (e.g., an imaging resolution) and/or a desired sensitivity (e.g., an imaging sensitivity) of the ECT imaging. The resolution and/or the sensitivity of the insert detector 420 may relate to a distance between the insert detector 420 and the object 450 to be imaged. For example, the less the distance between the insert detector 420 and the object 450, the better the resolution and/or the sensitivity of the insert detector 420. More descriptions of the arrangement may be found elsewhere in the present disclosure (e.g., FIG. 7 and the descriptions thereof).

Figure 4B:
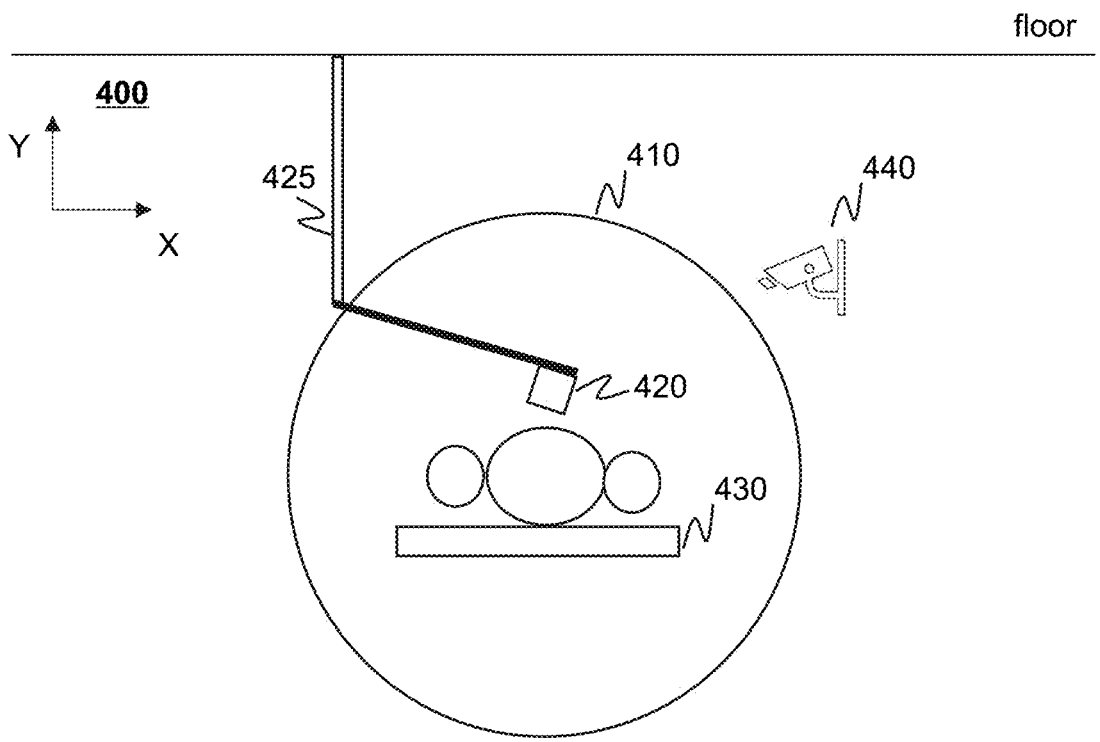

In some embodiments, the insert detector 420 may be disposed on a supporting assembly 425 which can support and/or cause the insert detector 420 to move. For illustration purposes, the supporting assembly 425 may include two ends, e.g., a first end 425-1 and a second end 425-2. The insert detector 420 may be fixed on the first end 425-1 of the supporting assembly 425 through a first connection. The second end 425-2 of the supporting assembly 425 may be fixed on any suitable regions (e.g., a region on the floor as shown in FIG. 4A, a region on the ceiling as shown in FIG. 4B, a region on a gantry of the imaging component 410, etc.) through a second connection. The first connection and/or the second connection may include at least one of a glue connection, a welding connection, a threaded connection, a socket connection, a groove connection, or the like, or any combination thereof.

In some embodiments, the insert detector 420 may be moved manually by a user or automatically by the supporting assembly 425. For example, the supporting assembly 425 may include a robotic arm via which the insert detector 420 can be moved/arranged automatically. Exemplary robotic arms may include a rigid robotic arm, a flexible robotic arm, or the like, or any combination thereof. The robotic arm may be caused to perform a rotational motion and/or a translational displacement, so that the insert detector 420 can be arranged to perform imaging. For instance, the robotic arm may be caused to move the insert detector 420 to the arrangement in response to an instruction input by a user (e.g., a doctor, a technician, etc.). In such cases, the user may remotely control the arrangement of the insert detector 420 through the robotic arm, which may eliminate a need for the user to arrange the insert detector 420, and/or walk back and forth between an operation platform and the imaging component 410, and further improving the efficiency of the ECT imaging.

As another example, the supporting assembly 425 may include a moveable support via which the insert detector 420 can be arranged/moved manually. A material of the moveable support may include metal (e.g., copper, iron, aluminum, etc.), an alloy, a non-metallic material (e.g., plastic, rubber, etc.), or the like, or any combination thereof. A rigidity of the material of the moveable support may be higher than a threshold rigidity, such that the insert detector 420 may have a limited motion or no motion during the ECT imaging of the object 450. In such cases, the insert detector 420 may be set to be arranged manually, thereby avoiding or reducing a cost and/or a risk of collision associated with using a robotic arm, and therefore improving a safety of the movement of the insert detector 420.

With the insert detector 420, the medical device 400 may be operated in a normal mode or an insert mode. In the normal mode, the insert detector 420 may be outside the detection region of the medical device 400. The medical device 400 may obtain the image data of the object 450 using the imaging component 410. In the insert mode, the insert detector 420 may be moved to the detection region of the medical device 400. The medical device 400 may obtain the image data of the object 450 using the insert detector 420 and the imaging component 410. By selecting different modes, the medical device 400 may be used in different situations. For example, the medical device 400 may be operated in the normal mode to perform a first imaging on the object 450. As another example, the medical device 400 may be operated in the insert mode to perform a second imaging on the object 450 for focusing on an ROI of the object 450. Before imaging, the supporting assembly 425 may be configured to move the insert detector 420 to a location adjacent or close to the ROI of the object 450. In such cases, a distance between the insert detector 420 and the object 450 may be less than a distance between the detector rings of the imaging component 410 and the object 450, thereby improving imaging resolution and/or imaging sensitivity of the ECT imaging, thereby improving quality of an image of the object 450 that is generated based on the image data of the object 450 acquired under the insert mode.

In some embodiments, the imaging component 440 may be a 3D camera 440. The 3D camera 440 may be configured to acquire image data of the insert detector 420 or at least a portion of the insert detector 420 before or during the ECT imaging on the object 450. In some embodiments, the 3D camera 440 may include a time of flight (TOF) camera, a binocular camera, a structured illumination camera, a stereo triangulation camera, a sheet of light triangulation device, an interferometry device, a coded aperture device, a stereo matching device, or the like, or any combination thereof. In some embodiments, the 3D camera 440 may be disposed on various suitable positions for obtaining the image data of the insert detector 420. For instance, the 3D camera 440 may be arranged on a component (e.g., the PET scanner) of the medical device 400. Merely by way of example, the 3D camera 440 may be disposed at an end of the bore of the PET scanner. As another example, the 3D camera 440 may be disposed between at least two detector rings of the PET scanner. As yet another example, the 3D camera 440 may be supported by a holder of the imaging component 410. The holder may be arranged on the table of the medical device 400. In some embodiments, the 3D camera 440 may be disposed on a component other than the medical device 400. For example, the 3D camera 440 may be disposed on a wall, the ceiling, or the floor of a room where the medical device 400 is located for performing the ECT imaging. More descriptions of the 3D camera 440 may be found elsewhere in the present disclosure (e.g., descriptions of the at least one image acquisition device 160 in FIG. 1)

In some embodiments, an accuracy level of the 3D camera 440 may be less than or equal to a distance threshold for achieving the accuracy condition of positioning the insert detector 420. By using the 3D camera 440 of a sufficient accuracy level, the insert detector 420 may be moved by a low-precision robotic arm or moved manually (the accuracy of which being greater than or equal to 5 mm), thereby avoiding the need and the associated cost of using a high-precision robotic arm while achieving a desired quality of the image of the object 450.

It should be noted that the medical devices are provided for illustration purposes, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, during the movement of the insert detector 420, the second connection may be movable, while during the ECT imaging, the second connection may be fixed. For example, the second end 425-2 of the supporting assembly 425 may be movable, e.g., along a rail, on the floor or the ceiling for moving the insert detector 420 to the arrangement. After a desired arrangement of the insert detector 420 is achieved for imaging, the second end 425-2 may be fixed on the floor or the ceiling.

Figure 5A:
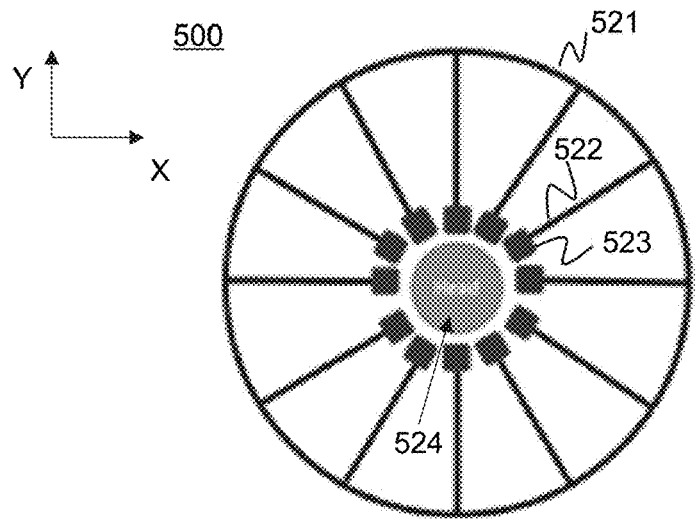
FIGS. 5A-5C are schematic diagrams illustrating exemplary medical devices according to some embodiments of the present disclosure.
Figure 5B:
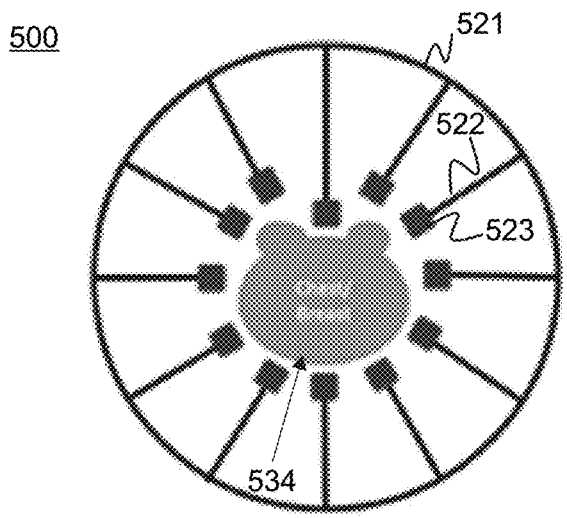
Figure 5C:
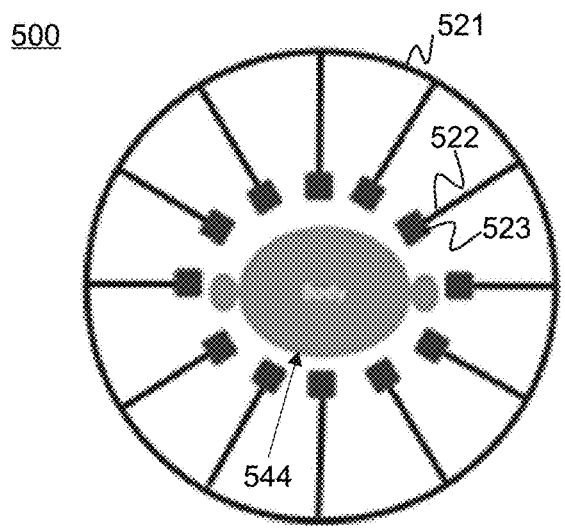

FIGS. 5A, 5B and 5C are schematic diagrams illustrating exemplary medical devices for regional ECT imaging according to some embodiments of the present disclosure. As used herein, a region ECT imaging may refer to an ECT imaging performed on a region (e.g., an ROI) of an object. As shown in FIGS. 5A-5C, the medical device 500 may include a gantry 521 with a bore, a plurality of supporting assemblies 522, and a plurality of insert detectors 523. Each of the plurality of insert detectors 523 may be fixed on a first end of its corresponding supporting assembly 522 and connected with the gantry 521 via a second end of its corresponding supporting assembly 522.

The plurality of insert detectors 523 may be configured to surround a detection region for performing an ECT imaging on an ROI of the object (e.g., the head 524 of the object as shown in FIG. 5A, the chest/breast 534 of the object as shown in FIG. 5B, or the body 544 of the object as shown in FIG. 5C). In some embodiments, a shape of the detection region formed by the plurality of insert detectors 523 may be adjusted according to a location, a shape, and/or size of the ROI of the object to be imaged. For example, the plurality of insert detectors 523 may be arranged to be close to the ROI of the object, so as to improve the resolution and the sensitivity (e.g., imaging resolution and/or imaging sensitivity) of each of the plurality of insert detectors 523. For example, a distance between each of the plurality of insert detectors 523 and the object may be greater than or equal to a safety distance between the insert detector 523 and the object. The less the distance between each of the plurality of insert detectors 523 and the object is, the better the resolution and the sensitivity of the insert detector 523 may be.

Figure 5D:
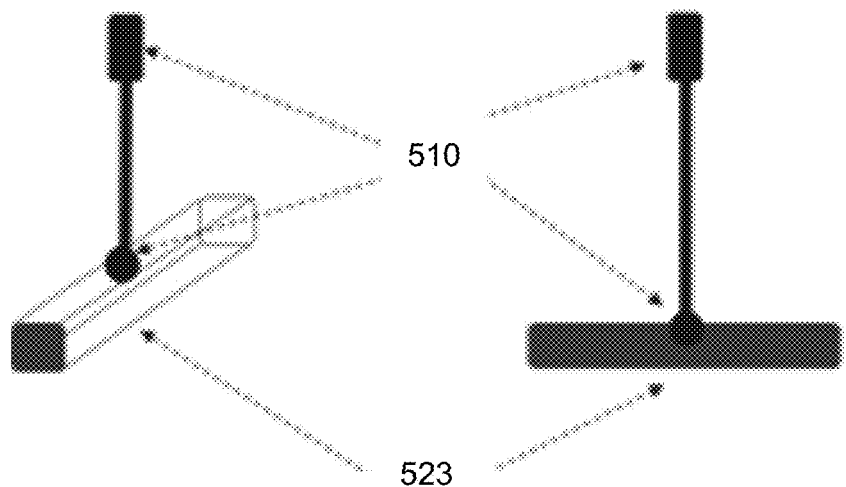
FIG. 5D is a schematic diagram illustrating an exemplary insert detector and its corresponding support assembly according to some embodiments of the present disclosure.

The plurality of supporting assemblies 522 may be configured to support and move the plurality of insert detectors 523. For example, each of the plurality of supporting assemblies 522 may be similar to the supporting assembly 522 as described in FIGS. 4A and 4B. That is, each of the plurality of supporting assemblies 522 may perform a rotational motion and/or a translational displacement to move its corresponding insert detector 523. As another example, each of the supporting assemblies 522 may include a support rod that can move its corresponding insert detector 523 to be closer to or away from the object along a radial direction of the gantry 521. For example, the supporting assembly 522 may include a motor support rod 510 as shown in FIG. 5D. The motor support rod 510 may include two ends. One end of the motor support rod 510 may be fixed on a side surface of its corresponding insert detector 523, and the other end of the motor support rod 510 may be fixed on the gantry 521. The motor support rod 510 may be caused to extend and retract, such that its corresponding insert detector 523 is moved.

By using the plurality of insert detectors 523, when a user (e.g., a doctor or a technician) focuses on the ROI of the object, the object may be scanned using the plurality of insert detectors 523 arranged in a vicinity of the ROI of the object, instead of using an ECT device including one or more detector rings of a fixed geometry and arrangement, which saves a cost of imaging, as the plurality of insert detectors 523 may have a lower cost than the ECT device including one or more detector rings. In addition, the plurality of insert detectors 523 may be moved to be closer to the object than the detector ring(s) of the ECT device, thereby improving imaging resolution and imaging sensitivity of the ECT imaging, which in turn may improve the quality of an image of the object generated based on image data acquired using the plurality of insert detectors 523.

It should be noted that the medical devices are provided for illustration purposes, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the medical device 500 may include only one supporting assembly 522 that is operably connected with and configured to move the plurality of insert detectors 523. In some embodiments, the medical device 500 may be a multi-modality device including, e.g., an ECT device with the plurality of insert detectors 523 and a CT device.

Figure 6:
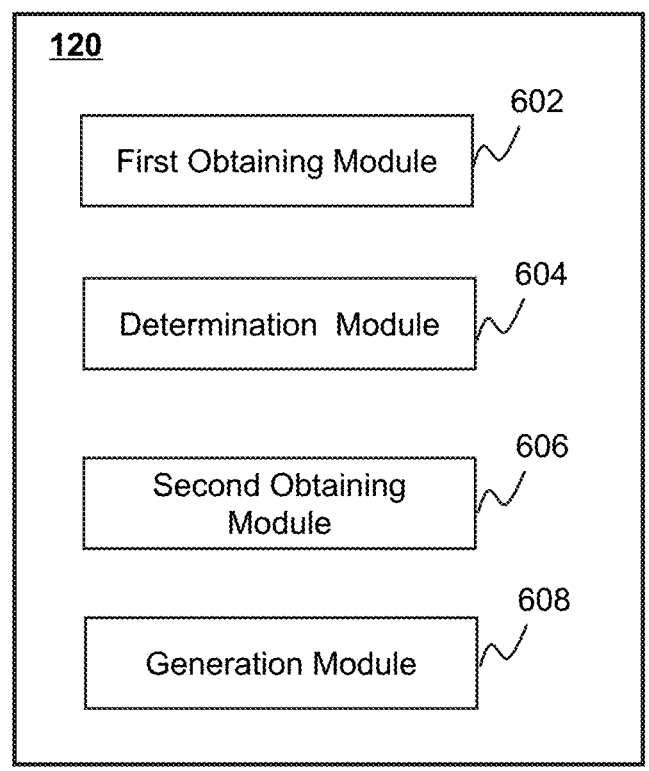
FIG. 6 is a block diagram illustrating an exemplary processing device according to some embodiments of the present disclosure.

FIG. 6 is a block diagram illustrating an exemplary processing device according to some embodiments of the present disclosure. In some embodiments, the processing device 120 may be in communication with a computer-readable storage medium (e.g., the storage device 130 illustrated in FIG. 1, or the storage device 220 illustrated in FIG. 2) and may execute instructions stored in the computer-readable storage medium. The processing device 120 may include a first obtaining module 602, a determination module 604, a second obtaining module 606, and a generation module 608.

The first obtaining module 602 may be configured to obtain, using at least one image acquisition device, image data of at least one insert detector of an ECT device. The ECT device (e.g., the medical device 110, 400, or 500) may be configured to scan an object and/or at least a portion of the object, and obtain corresponding scan data (also referred to as image data of the object). The image data of the at least one insert detector may include 3D optical data of the at least one insert detector, or at least a part thereof, which may include or reflect position data and/or depth data of the at least one insert detector, etc. More descriptions regarding the obtaining of the image data of the at least one insert detector of the ECT device may be found elsewhere in the present disclosure. See, e.g., operation 702 and relevant descriptions thereof.

The determination module 604 may be configured to determine, based on the image data of the at least one insert detector, an arrangement of the at least one insert detector in a coordinate system (also referred to as a first coordinate system) that relates to the ECT device. In some embodiments, the arrangement of the at least one insert detector may include a target position, a target orientation, or the like, or any combination thereof, of the at least one insert detector. More descriptions regarding the determination of the arrangement of the at least one insert detector may be found elsewhere in the present disclosure. See, e.g., operation 704 and relevant descriptions thereof.

The second obtaining module 606 may be configured to obtain the image data of the object by performing, using the at least one insert detector, the ECT imaging on the object. In some embodiments, after the at least one insert detector is arranged to image the object, the at least one insert detector may perform an ECT imaging on the object. More descriptions regarding the obtaining of the image data of the object may be found elsewhere in the present disclosure. See, e.g., operation 706 and relevant descriptions thereof.

The generation module 608 may be configured to generate, based on the arrangement of the at least one insert detector and the image data of the object, an image of the object. In some embodiments, the generation module 608 may determine a system matrix of the ECT device based on the arrangement of the at least one insert detector. In some embodiments, the generation module 608 may generate the image of the object based on the system matrix and the image data of the object. More descriptions regarding the generation of the image of the object may be found elsewhere in the present disclosure. See, e.g., operation 708 and relevant descriptions thereof.

It should be noted that the above descriptions of the processing device 120 are provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. In some embodiments, the processing device 120 may include one or more other modules. For example, the processing device 120 may include a storage module to store data generated by the modules in the processing device 120. In some embodiments, any two of the modules may be combined as a single module, and any one of the modules may be divided into two or more units. For example, the first obtaining module 602 and 606 may be combined as a single obtaining module that can obtain both the image data of the at least one insert detector and the image data of the object.

Figure 7:
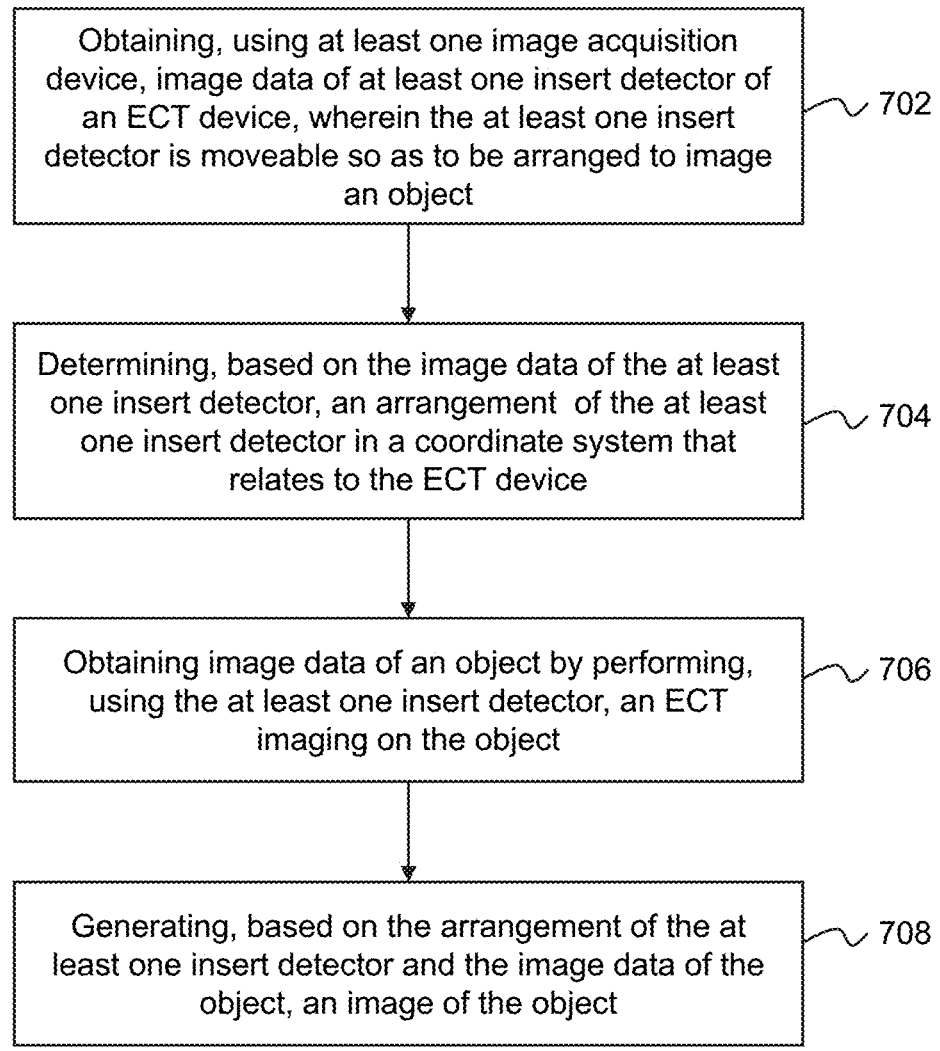
FIG. 7 is a flowchart illustrating an exemplary process for obtaining an image of an object according to some embodiments of the present disclosure.

FIG. 7 is a flowchart illustrating an exemplary process for obtaining an image of an object according to some embodiments of the present disclosure. Process 700 may be implemented in the medical system 100 illustrated in FIG. 1. For example, the process 700 may be stored in the storage device 130, the storage device 220, and/or the storage 390 in the form of instructions (e.g., an application), and invoked and/or executed by the processing device 120 (e.g., the processing device 120 illustrated in FIG. 1, or one or more modules in the processing device 120 illustrated in FIG. 6). The operations of the illustrated process presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

In 702, the processing device 120 (e.g., the first obtaining module 602) may obtain, using at least one image acquisition device, image data of at least one insert detector (i.e., at least one movable detector) of an ECT device.

The ECT device (e.g., the medical device 110, 400, or 500) may be configured to scan an object and/or at least a portion of the object, and obtain corresponding scan data (also referred to as image data of the object). Exemplary ECT devices may include a PET device, a SPECT device, or the like, or any combination thereof. In some embodiments, the ECT device may include the at least one insert detector that is moveable so as to be arranged to image the object. The at least one insert detector may be configured to obtain the image data (also referred to as a first portion of the image data of the object) of the object by performing an ECT imaging on a region (e.g., an ROI) of the object after the at least one insert detector is arranged. In some embodiments, the ECT device may include one or more detector rings. The one or more detector rings may also be configured to perform the ECT imaging on the object. More descriptions of the ECT device and the at least one insert detector may be found elsewhere in the present disclosure (e.g., FIGS. 1, 4A, 4B, and 5A-5C, and the descriptions thereof).

The image data of the at least one insert detector may include 3D optical data of the at least one insert detector, or at least a part thereof, which may include or reflect position data and/or depth data of the at least one insert detector, etc. For example, the image data of the at least one insert detector may include point-cloud data of the at least one insert detector. The point-cloud data may include a plurality of data points, each of which may represent a physical point on a surface of the at least one insert detector and can be described using one or more feature values of the physical point (e.g., feature values relating to the position and/or the composition of the physical point).

In some embodiments, the image data of the at least one insert detector may be acquired by the at least one image acquisition device. Merely by way of example, the at least one image acquisition device may include at least one 3D camera. Exemplary 3D cameras may include a time of flight (TOF) camera, a binocular camera, a structured illumination camera, or the like, or any combination thereof. In some embodiments, each of the at least one 3D camera may correspond to one or more of the at least one insert detector. That is, one or more of the at least one insert detector (or a portion of each of the one or more of the at least one insert detector) may be located within a field of view (FOV) of the each of the at least one 3D camera. For example, one of the at least one insert detector (or a portion thereof) may be located within the FOV of the each of the at least one 3D camera that is, a 3D camera corresponds to an insert detector. As another example, a plurality of the at least one insert detector (or a portion thereof) may be located within the FOV of each of at least one of the at least one 3D camera; that is, a 3D camera corresponds to a plurality of insert detectors. More descriptions of the 3D camera and/or correspondence of the 3D camera and the insert detector may be found elsewhere in the present disclosure (e.g., FIGS. 1 and 4A, and the descriptions thereof).

In some embodiments, the at least one 3D camera may acquire the image data of the at least one insert detector before the ECT imaging. For example, after the at least one insert detector is arranged, the at least one 3D camera may acquire the image data of the at least one insert detector. In some embodiments, the at least one 3D camera may acquire the image data of the at least one insert detector during the ECT imaging. For example, when the at least one insert detector is performing the ECT imaging, the at least one 3D camera may acquire the image data of the at least one insert detector.

In some embodiments, the processing device 120 may obtain the image data of the at least one insert detector directly from the at least one 3D camera. Alternatively, the at least one 3D camera may store the image data of the at least one insert detector in a storage device (e.g., the storage device 130, the storage device 220, the storage 390, or an external storage device) from which the image data may be retrieved. The processing device 120 may retrieve the image data of the at least one insert detector from the storage device.

In 704, the processing device 120 (e.g., the determination module 604) may determine, based on the image data of the at least one insert detector, an arrangement of the at least one insert detector (i.e., the at least one movable detector) in a coordinate system (also referred to as a first coordinate system) that relates to the ECT device.

In some embodiments, the arrangement of the at least one insert detector may include a target position, a target orientation, or the like, or any combination thereof, of the at least one insert detector. The target position of the at least one insert detector may refer to a position where the at least one insert detector is located for performing the ECT imaging on the object. The target orientation of the at least one insert detector may refer to an orientation of the at least one insert detector for performing the ECT imaging on the object.

In some embodiments, the at least one insert detector may be arranged based on a target region of the object to be imaged, a resolution (e.g., an imaging resolution) of the at least one insert detector, a sensitivity (e.g., an imaging sensitivity) of the at least one insert detector, or the like, or any combination thereof. The target region of the object to be imaged may refer to a region that is to be imaged by the ECT device. For example, the target region of the object to be imaged may include a region of interest (ROI), e.g., a region including a tumor, etc., of the object. In some embodiments, the closer the target region of the object is to the at least one insert detector, the more enhancement there may be in imaging resolution and/or imaging sensitivity. Therefore, a distance between the at least one insert detector and the target region of the object to be imaged may be determined to be less than a distance threshold. The distance threshold may be determined based on the target region of the object to be imaged, the resolution (e.g., an imaging resolution) of the at least one insert detector, the sensitivity (e.g., an imaging sensitivity) of the at least one insert detector, or the like, or any combination thereof. For example, for improving the quality of the image, the at least one insert detector may be arranged to be closer (in terms of considerations including, e.g., safety) to the target region of the object to be imaged. As another example, to satisfy a desired imaging resolution and/or imaging sensitivity, a distance between the at least one insert detector and the target region of the object to be imaged may be less than the distance threshold.

In some embodiments, the arrangement of the at least one insert detector may be determined before and/or during the ECT imaging. For example, a scanning plan including the arrangement of the at least one insert detector may be determined before the ECT imaging. As another example, the scanning plan including the arrangement of the at least one insert detector may be modified during the ECT imaging based on a portion of the image data of the object.

In some embodiments, the at least one insert detector may be set to move manually (e.g., by a user) or automatically (e.g., by at least one supporting assembly 425 as shown in FIG. 4A or the supporting assembly 522 as shown in FIG. 5A). For example, a user (e.g., a doctor, a technician, etc.) may manually move the at least one insert detector to the arrangement by maneuvering a supporting assembly (e.g., the moveable support described in FIG. 4A or the supporting assembly 522 as shown in FIG. 5A). As another example, the at least one insert detector may be automatically moved to the arrangement by one or more robotic arms according to an instruction input by the user or the scanning plan.

In some embodiments, the processing device 120 may determine the arrangement of the at least one insert detector in the first coordinate system based on the image data of the at least one insert detector acquired by the at least one 3D camera. For example, the processing device 120 may determine the arrangement including the target position and/or the target orientation of the at least one insert detector in the first coordinate system. More descriptions of the determination of the arrangement of the at least one insert detector in the first coordinate system may be found elsewhere in the present disclosure (e.g., FIGS. 8 and 9, and the descriptions thereof).

In 706, the processing device 120 (e.g., the second obtaining module 606) may obtain the image data of the object by performing, using the at least one insert detector (i.e., the at least one movable detector), the ECT imaging on the object.

In some embodiments, after the at least one insert detector is arranged to image the object, the at least one insert detector may perform an ECT imaging on the object. For example, the at least one insert detector may perform the ECT imaging on the target region of the object. In some embodiments, the processing device 120 may obtain the image data of the object directly from the at least one insert detector. Alternatively, the at least one insert detector may store the image data of the object in a storage device (e.g., the storage device 130, the storage device 220, the storage 390, or an external storage device). The processing device 120 may obtain the image data of the object from the storage device.

In some embodiments, the ECT device may further include one or more detector rings. The one or more detector rings may be configured to perform the ECT imaging on the object. For example, the one or more detector rings and the at least one insert detector may perform the ECT imaging on the target region of the object simultaneously. As another example, the one or more detector rings and the at least one insert detector may perform the ECT imaging on the target region of the object to be imaged in sequence. In such cases, the processing device 120 may obtain the image data of the object acquired by the at least one insert detector and by the one or more detector rings. The image data of the object may include the first portion acquired by the at least one insert detector and the second portion acquired by the one or more detector rings. For example, the processing device 120 may obtain the first portion of the image data directly from the at least one insert detector, and obtain the second portion of the image data directly from the one or more detector rings. As another example, the at least one insert detector may store the first portion of the image data in a storage device (e.g., the storage device 130, the storage device 220, the storage 390, or an external storage device), and the one or more PET rings may store the second portion of the image data in a same or different storage device. The processing device 120 may obtain the first portion and the second portion of the image data from the storage device(s).

In 708, the processing device 120 (e.g., the generation module 608) may generate, based on the arrangement of the at least one insert detector (i.e., the at least one movable detector) and the image data of the object, an image of the object.

In some embodiments, the processing device 120 may determine a system matrix of the ECT device based on the arrangement of the at least one insert detector. The system matrix of the ECT device may be represented by A (i, j), which reflect a probability that a photon pair emitted at a jth anatomical pixel of the object is received by an ith detector (e.g., an insert detector or a fixed detector unit of the one or more detector rings) of the ECT device. For example, the ECT device may include one or more detector rings and the at least one insert detector. Therefore, the processing device 120 may determine the system matrix of the ECT device based on the arrangement of the at least one insert detector in the first coordinate system and the arrangement of the fixed detector units of the one or more PET rings in the first coordinate system. For instance, the processing device 120 may determine a system structure based on the arrangement of the at least one insert detector in the first coordinate system and the arrangement of the fixed detector units of the one or more PET rings in the first coordinate system. The system structure may represent position relationships between components (e.g., the at least one insert detector, the one or more detector rings, etc.) of the ECT device. Further, the processing device 120 may determine the system matrix of the ECT device based on the system structure.

In some embodiments, the processing device 120 may generate the image of the object based on the system matrix and the image data of the object. For example, the processing device 120 may generate the image of the object by reconstructing, based on the system matrix using a reconstruction algorithm, the image data of the object in the first coordinate system (e.g., the first portion and/or the second portion of the image data of the object in the first coordinate system). Exemplary reconstruction algorithms may include a filtered back-projection (FBP) algorithm (e.g., an FBP-Hanning algorithm, an FBP-Butterworth algorithm, etc.), an iterative reconstruction algorithm (e.g., a maximum likelihood expectation maximization (MLEM) algorithm, an ordered subset expectation maximization (OSEM) algorithm), a 2D Fourier transform algorithm, a 3D reconstruction algorithm, or the like, or any combination thereof.

In some embodiments, when the image data of the object includes the first portion acquired by the at least one insert detector and the second portion acquired by the one or more detector rings, the processing device 120 may generate the image of the object by processing, based on the system matrix, the first portion acquired by the at least one insert detector and the second portion acquired by the one or more detector rings. For example, the processing device 120 may reconstruct the first portion acquired by the at least one insert detector and the second portion acquired by the one or more detector rings, respectively, to obtain a first image corresponding to the first portion and a second image corresponding to the second portion, and fuse the first image and the second image to obtain the image of the object. As another example, the processing device 120 may obtain fusion image data of the object by fusing the first portion acquired by the at least one insert detector and the second portion acquired by the one or more detector rings, and obtain the image of the object by reconstructing the fusion image data of the object. In some embodiments, during a fusion operation, the processing device 120 may assign weights to the first portion acquired by the at least one insert detector (e.g., the first portion, the first image) and the second portion acquired by the one or more detector rings (e.g., the second portion, the second image). The weights may be determined by the user or a system default setting.

In some embodiments, before the image data of the object is used to generate the image of the object, the image data of the object may be performed a preprocessing operation. For example, the image data of the object may be performed a normalization operation. As another example, the image data of the object may be preprocessed using a noise reduction algorithm. As still another example, the image data of the object may be preprocessed using a correction algorithm. Exemplary correction algorithms may include a random correction, a scatter correction, an attenuation correction, a dead time correction, normalization, or the like, or any combination thereof.

It should be noted that the description of the process 700 is provided for the purposes of illustration, and not intended to limit the scope of the present disclosure. For persons having ordinary skills in the art, various variations and modifications may be conducted under the teaching of the present disclosure. For example, operations 702 and 704 may be integrated into a single operation. As another example, an additional operation for image display may be added after operation 708. However, those variations and modifications may not depart from the protection of the present disclosure.

Figure 8:
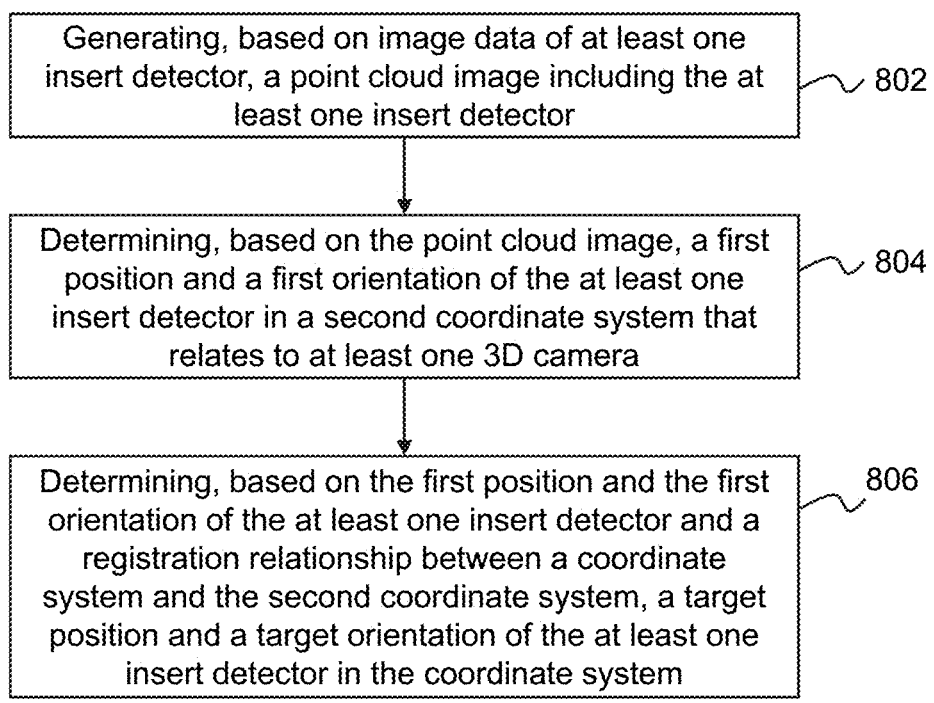
FIG. 8 is a flowchart illustrating an exemplary process for determining an arrangement of at least one insert detector according to some embodiments of the present disclosure.

FIG. 8 is a flowchart illustrating an exemplary process for determining an arrangement of at least one insert detector in a coordinate system according to some embodiments of the present disclosure. Process 800 may be implemented in the medical system 100 illustrated in FIG. 1. For example, the process 800 may be stored in the storage device 130 and/or the storage device 220 in the form of instructions (e.g., an application), and invoked and/or executed by the processing device 120 (e.g., the processing device 120 illustrated in FIG. 1, or one or more modules in the processing device 120 illustrated in FIG. 6). The operations of the illustrated process presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting. In some embodiments, one or more operations of process 800 may be performed to achieve at least part of operation 704 as described in connection with FIG. 7.

In 802, the processing device 120 (e.g., the determination module 604) may generate, based on image data of at least one insert detector, a point cloud image including the at least one insert detector.

The image data of the at least one insert detector may be acquired by at least one 3D camera in connection with FIG. 7. In some embodiments, the image data of the at least one insert detector may include 3D image data of the at least one insert detector, for example, point-cloud data of the at least one insert detector, which reflects position (including, e.g., depth) and/or orientation of the at least one insert detector. The point-cloud data may include a plurality of data points, each of which may represent a physical point on a surface of the at least one insert detector and can be described using one or more feature values of the physical point (e.g., feature values relating to the position and/or the composition of the physical point).

The point cloud image may refer to a 3D image including the at least one insert detector (or a portion thereof). In some embodiments, the processing device 120 may obtain the point cloud image including the at least one insert detector by reconstructing the image data of the at least one insert detector using a reconstruction algorithm. Exemplary reconstruction algorithms may include a filtered back-projection (FBP) algorithm (e.g., an FBP-Hanning algorithm, an FBP-Butterworth algorithm, etc.), an iterative reconstruction algorithm (e.g., a maximum likelihood expectation maximization (MLEM) algorithm, an ordered subset expectation maximization (OSEM) algorithm), a 2D Fourier transform algorithm, a 3D reconstruction algorithm, or the like, or any combination thereof.

In some embodiments, after the point cloud image is generated, the point cloud image may be further processed. For example, an image segmentation operation may be performed on the point cloud image so as to retain the at least one insert detector in the segmented point cloud image and remove a portion other than the at least one insert detector from the segmented point cloud image. Therefore, a workload for subsequent image processing may be reduced, and the efficiency of the imaging may be improved.

In 804, the processing device 120 (e.g., the determination module 604) may determine, based on the point cloud image, a first position and a first orientation of the at least one insert detector in a second coordinate system that relates to the at least one 3D camera.

The second coordinate system that relates to the at least one 3D camera may refer to a coordinate system that is established based on the at least one 3D camera. For example, the second coordinate system may be established based on an FOV of the at least one 3D camera. In some embodiments, the second coordinate system may be determined when the at least one 3D camera is disposed or mounted. For example, after the at least one 3D camera is disposed, the processing device 120 may obtain related information (e.g., a location, an FOV, etc.) of the at least one 3D camera, and establish the second coordinate system.

In some embodiments, the processing device 120 may determine the at least one insert detector in the point cloud image. For example, the processing device 120 may determine at least a portion of the at least one insert detector in the point cloud image. As another example, the processing device 120 may obtain an outline and/or a surface of the at least one insert detector in the point cloud image based on an image recognition algorithm (e.g., an image recognition algorithm based on color segmentation, an image recognition algorithm based on texture, an image recognition algorithm based on histogram of oriented gradients (HOG), etc.).

In some embodiments, the processing device 120 may determine, based on the determined at least one insert detector in the point cloud image, six degrees of freedom that show the first position and the first orientation of the at least one insert detector in the second coordinate system. The six degrees of freedom of the at least one insert detector may indicate six degrees of freedom of a point (e.g., a geometric center point, a center point of a surface of the at least one insert detector that is facing the object, etc.) of the at least one insert detector. In some embodiments, the six degrees of freedom may include Euler angles (3 degrees of freedom) and spatial locations (3 degrees of freedom), wherein the Euler angles (3 degrees of freedom) show the first orientation of the at least one insert detector, and the spatial locations (3 degrees of freedom) show the first position of the at least one insert detector. In some embodiments, the processing device 120 may extract the six degrees of freedom of the at least one insert detector from the point cloud image as the six degrees of freedom of the at least one insert detector based on an iterative closest point (ICP) algorithm. For example, the processing device 120 may extract the six degrees of freedom of the point (e.g., the geometric center point, the center point of a plane oriented to the object, etc.) from the point cloud image as the six degrees of freedom of the at least one insert detector based on the ICP algorithm. More descriptions of the extraction of the six degrees of freedom may be found elsewhere in the present disclosure (e.g., FIG. 9 and the descriptions thereof).

In 806, the processing device 120 (e.g., the determination module 604) may determine, based on the first position and the first orientation of the at least one insert detector and a registration relationship between a coordinate system and the second coordinate system, a target position and a target orientation of the at least one insert detector in the coordinate system.

The coordinate system (also referred to as the first coordinate system) may refer to a coordinate system that relates to an ECT device. For example, the coordinate system may be established based on the ECT device. For instance, a center point of a detector ring may be set as an origin of the coordinate system, a horizontal direction of the detector ring may be set as an X axis of the coordinate system, a vertical direction of the detector ring may be set as a Y axis of the coordinate system, and a direction that a table enters the ECT device may be set as a Z axis of the coordinate system, as shown in FIG. 1.

The registration relationship between the coordinate system and the second coordinate system may refer to a transformation relationship (e.g., a transforming matrix) that converts a position and/or an orientation in the second coordinate system to a position and/or an orientation in the first coordinate system. In some embodiments, the registration relationship may be determined based on a relative position between the at least one 3D camera and the ECT device using a transformation algorithm. Exemplary transformation algorithms may include a direct parameter algorithm, a barycentre datum algorithm, a similarity transformation algorithm, a polynomial approximation algorithm, or the like, or any combination thereof. For example, the processing device 120 may determine the registration relationship based on first arrangement information (e.g., the position and/or the orientation in the first coordinate system) of one or more points in the first coordinate system and second arrangement information (e.g., the position and/or the orientation in the second coordinate system) of the corresponding one or more points in the second coordinate system.

In some embodiments, the processing device 120 may determine the target position and the target orientation of the at least one insert detector in the coordinate system based on the first position and the first orientation of the at least one insert detector and the registration relationship. For example, the processing device 120 may convert the first position and the first orientation of the at least one insert detector in the second coordinate system to the target position and the target orientation of the at least one insert detector in the first coordinate system based on the transformation relationship.

It should be noted that the description of the process 800 is provided for the purposes of illustration, and not intended to limit the scope of the present disclosure. For persons having ordinary skills in the art, various variations and modifications may be conducted under the teaching of the present disclosure. However, those variations and modifications may not depart from the protection of the present disclosure. In some embodiments, the registration relationship between the first coordinate system and the second coordinate system may be determined based on a third coordinate system (e.g., a world coordinate system). For instance, the registration relationship may be determined based on a first registration relationship between the first coordinate system and the third coordinate system and a second registration relationship between the second coordinate system and the third coordinate system.

Figure 9:
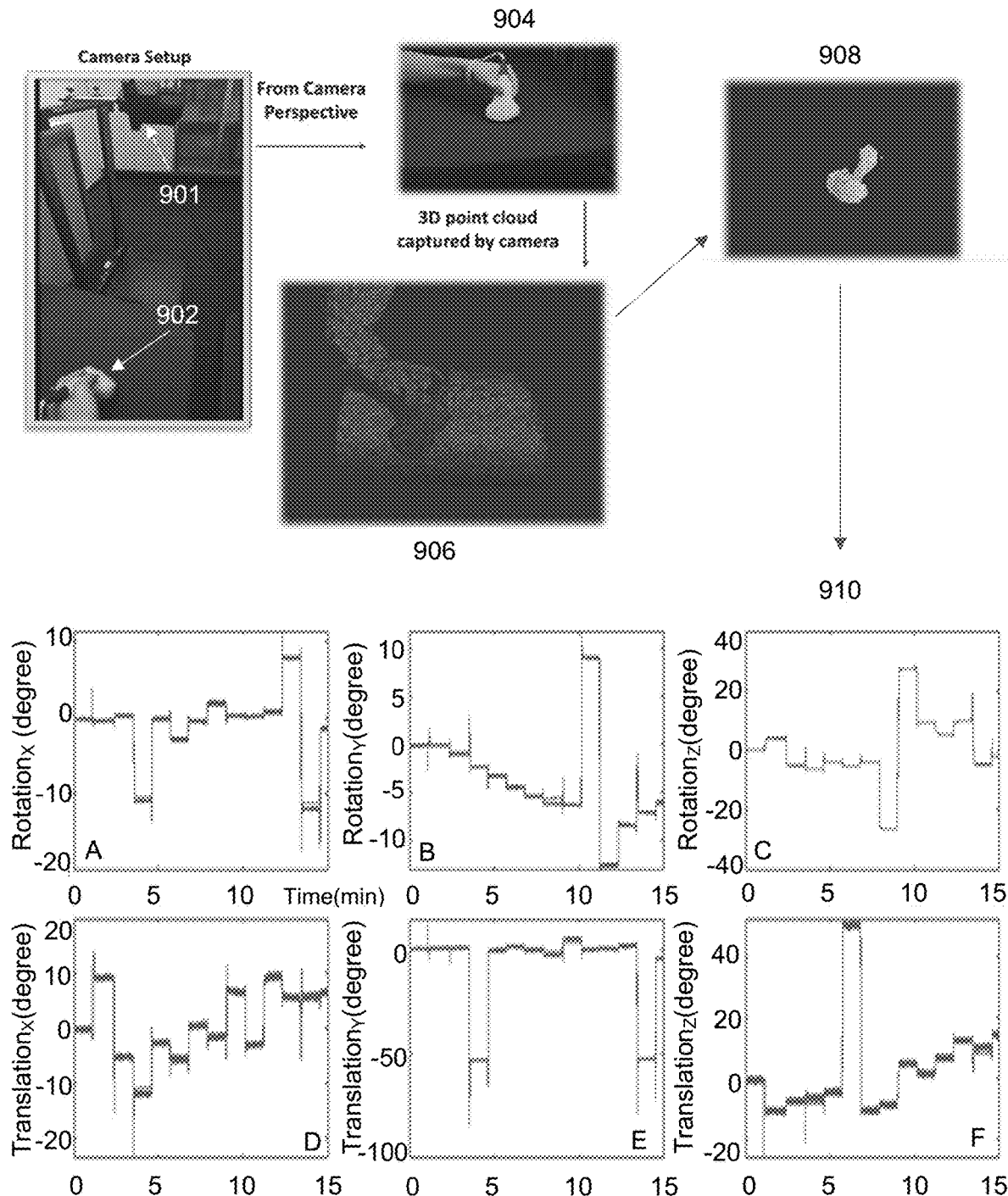
FIG. 9 is a schematic diagram illustrating an exemplary process for determining an arrangement of at least one insert detector according to some embodiments of the present disclosure.

FIG. 9 is a schematic diagram illustrating an exemplary process for determining an arrangement of a detector according to some embodiments of the present disclosure.

As shown in FIG. 9, a detector 902 may be located within an FOV of a 3D camera 901. The 3D camera 901 may acquire image data 904 of the detector 902 during a time period. In some embodiments, the detector 902 may move during the time period. A series of point cloud images may be generated by reconstructing the image data 904. For example, a point cloud image 906 may be generated by reconstructing a portion of the image data 904 acquired at a specific time point of the time periods. The point cloud image 906 may be performed on a segmentation operation to obtain a segmented image 908 that includes the detector 902. Six degrees of freedom of the detector 902 may be extracted based on the segmented image 908. A first position and a first orientation of the detector 902 in a coordinate system that relates to the 3D camera 901 at the specific time point may be determined based on the extracted six degrees of freedom of the detector 902. An image 910 includes six curve graphs (denoted by A-F) illustrating six degrees of freedom of the detector 902 during the time period respectively, which reflects a change of arrangements of the detector 902 during the time period. In some embodiments, the segmentation operation may be removed, and the six degrees of freedom of the detector 902 may be extracted based on the point cloud image 906.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, device, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for molecular imaging, comprising:
at least one storage device including a set of instructions; and
at least one processor configured to communicate with the at least one storage device, wherein when executing the set of instructions, the at least one processor is configured to direct the system to perform operations including:
obtaining, using at least one three-dimensional (3D) camera, image data of at least one movable detector of an emission computed tomography (ECT) device;
determining, based on the image data of the at least one movable detector, an arrangement of the at least one movable detector in a coordinate system that relates to the ECT device, wherein determining the arrangement of the at least one movable detector includes:
generating, based on the image data of the at least one movable detector, an arrangement of the at least one movable detector in a second coordinate system that relates to the at least one 3D camera; and
determining, based on the arrangement of the at least one movable detector in the second coordinate system and a registration relationship between the coordinate system and the second coordinate system, the arrangement of the at least one movable detector in the coordinate system;
obtaining image data of an object by performing, using the at least one movable detector, an ECT imaging on the object; and
generating, based on the arrangement of the at least one movable detector and the image data of the object, an image of the object.

2. The system of claim 1, wherein the at least one movable detector is set to the arrangement manually or using one or more robotic arms.

3. The system of claim 1, wherein the arrangement of the at least one movable detector is determined based on at least one of a target region of the object to be imaged, a resolution ratio of the at least one movable detector, or a sensitivity of the at least one movable detector.

4. The system of claim 1, wherein the at least one 3D camera includes at least one of a time of flight (TOF) camera, a binocular camera, or a structured illumination camera.

5. The system of claim 1, wherein each of the at least one 3D camera corresponds to one or more of the at least one movable detector.

6. The system of claim 1, wherein the arrangement of the at least one movable detector in the coordinate system includes at least one of a target position or a target orientation of the at least one movable detector.

7. The system of claim 6, wherein the arrangement of the at least one movable detector in the second coordinate system includes a first position and a first orientation of the at least one movable detector in the second coordinate system, the generating, based on the image data of the at least one movable detector, an arrangement of the at least one movable detector in a second coordinate system that relates to the at least one 3D camera includes:

generating, based on the image data of the at least one movable detector, a point cloud image including the at least one movable detector; and determining, based on the point cloud image, the first position and the first orientation of the at least one movable detector in the second coordinate system that relates to the at least one 3D camera; and the determining, based on the arrangement of the at least one movable detector in the second coordinate system and a registration relationship between the coordinate system and the second coordinate system, the arrangement of the at least one movable detector in the coordinate system includes:

determining, based on the first position and the first orientation of the at least one movable detector and the registration relationship between the coordinate system and the second coordinate system, the target position and the target orientation of the at least one movable detector in the coordinate system.

8. The system of claim 7, wherein the determining, based on the point cloud image, the first position and the first orientation of the at least one movable detector in the second coordinate system includes:

determining the at least one movable detector in the point cloud image; and determining, based on the determined at least one movable detector in the point cloud image, six degrees of freedom that show the first position and the first orientation of the at least one movable detector in the second coordinate system.

9. The system of claim 1, wherein the ECT device further includes one or more detector rings, and the obtaining image data of an object by performing, using the at least one movable detector, an ECT imaging on the object includes:

performing the ECT imaging using the at least one movable detector and the one or more detector rings; and obtaining the image data of the object acquired by the at least one movable detector and the one or more detector rings, the image data of the object including a first portion acquired by the at least one movable detector and a second portion acquired by the one or more detector rings.

10. The system of claim 1, wherein the generating an image of the object based on the arrangement of the at least one movable detector and the image data of the object includes:

determining a system matrix of the ECT device based on the arrangement of the at least one movable detector; and generating the image of the object based on the system matrix and the image data of the object.

11. The system of claim 1, wherein the ECT device includes a positron emission tomography (PET) device or a single-photon emission computerized tomography (SPECT) device.

12. A method for molecular imaging, which is implemented on a computing device having at least one processor and at least one storage device, the method comprising:

obtaining, using at least one three-dimensional (3D) camera, image data of at least one movable detector of an emission computed tomography (ECT) device;

determining, based on the image data of the at least one movable detector, an arrangement of the at least one movable detector in a coordinate system that relates to the ECT device, wherein determining the arrangement of the at least one movable detector includes:

generating, based on the image data of the at least one movable detector, an arrangement of the at least one movable detector in a second coordinate system that relates to the at least one 3D camera; and determining, based on the arrangement of the at least one movable detector in the second coordinate system and a registration relationship between the coordinate system and the second coordinate system, the arrangement of the at least one movable detector in the coordinate system;

obtaining image data of an object by performing, using the at least one movable detector, an ECT imaging on the object; and generating, based on the arrangement of the at least one movable detector and the image data of the object, an image of the object.

13. The method of claim 12, wherein the at least one movable detector is set to the arrangement manually or using one or more robotic arms.

14. The method of claim 12, wherein the arrangement of the at least one movable detector is determined based on at least one of a target region of the object to be imaged, a resolution ratio of the at least one movable detector, or a sensitivity of the at least one movable detector.

15. A system for imaging, comprising:

an emission computed tomography (ECT) device including at least one movable detector configured to be arranged to acquire image data of an object; and at least one three-dimensional (3D) camera configured to obtain image data of the at least one movable detector for determining an arrangement of the at least one movable detector in a coordinate system that relates to the ECT device, wherein determining the arrangement of the at least one movable detector includes:

generating, based on the image data of the at least one movable detector, an arrangement of the at least one movable detector in a second coordinate system that relates to the at least one 3D camera; and determining, based on the arrangement of the at least one movable detector in the second coordinate system and a registration relationship between the coordinate system and the second coordinate system, the arrangement of the at least one movable detector in the coordinate system;

the image data of the object and the arrangement of the at least one movable detector are used to generate an image of the object.

16. The system of claim 15, wherein the arrangement of the at least one movable detector includes at least one of a target position and a target orientation of the at least one movable detector.

17. The system of claim 15, wherein the at least one 3D camera includes at least one of a time of flight (TOF) camera, a binocular camera, or a structured illumination camera.

18. The system of claim 15, wherein each of the at least one 3D camera corresponds to one or more of the at least one movable detector.

19. The system of claim 15, wherein the ECT device further includes one or more detector rings, and the image data of the object includes a first portion acquired by the at least one movable detector and a second portion acquired by the one or more detector rings.

20. The system of claim 15, wherein the ECT device includes a positron emission tomography (PET) device or a single-photon emission computerized tomography (SPECT) device.

* * * * *